(12) United States Patent
Murase

(10) Patent No.: US 7,760,284 B2
(45) Date of Patent: Jul. 20, 2010

(54) LIQUID CRYSTAL DEVICE, METHOD FOR MANUFACTURING LIQUID CRYSTAL DEVICE, AND ELECTRONIC APPARATUS

(75) Inventor: Tetsuji Murase, Nagano (JP)

(73) Assignee: Epson Imaging Devices Corporation, Nagano (JP)

( * ) Notice: Subject to any disclaimer, the term of this patent is extended or adjusted under 35 U.S.C. 154(b) by 654 days.

(21) Appl. No.: 11/683,060

(22) Filed: Mar. 7, 2007

(65) Prior Publication Data

US 2007/0222911 A1    Sep. 27, 2007

(30) Foreign Application Priority Data

Mar. 23, 2006  (JP) ............... 2006-080393

(51) Int. Cl.
  *G02F 1/1333* (2006.01)
  *G02F 1/1335* (2006.01)
  *F21V 7/04* (2006.01)
  *G09G 3/34* (2006.01)
  *H01L 29/18* (2006.01)

(52) U.S. Cl. .............. 349/58; 349/61; 349/62; 349/63; 349/64; 349/65; 349/67; 349/150; 362/615; 345/84; 257/88

(58) Field of Classification Search ............. 349/58, 349/61–63, 150; 362/615; 345/84; 257/88
See application file for complete search history.

(56) References Cited

U.S. PATENT DOCUMENTS

| 2003/0071941 A1* | 4/2003 | Mizuno ............... 349/96 |
| 2005/0088830 A1* | 4/2005 | Yumoto et al. ........ 361/749 |
| 2006/0133109 A1* | 6/2006 | Kim et al. ............ 362/615 |

FOREIGN PATENT DOCUMENTS

| JP | 2002-098945 | 4/2002 |
| JP | 2004-258180 | 9/2004 |

* cited by examiner

*Primary Examiner*—Hoan C Nguyen
(74) *Attorney, Agent, or Firm*—Lowe Hauptman Ham & Berner LLP

(57) ABSTRACT

A liquid crystal device includes a liquid crystal panel; light sources; a light guide plate, opposed to the light sources, for guiding light emitted from the light sources to the liquid crystal panel; a flexible printed circuit board electrically connected to the liquid crystal panel; and a housing accommodating the liquid crystal panel and the light guide plate. The flexible printed circuit board is fixed to the rear face of the light guide plate in such a state that the flexible printed circuit board is curved. The liquid crystal panel is fixed to the housing with a light-shielding double-faced tape placed outside a display region including a sub-region containing the light sources. The light sources are spaced from the light-shielding double-faced tape with an adhesion-preventing member disposed therebetween or adhesion-preventing treatment is performed.

10 Claims, 17 Drawing Sheets

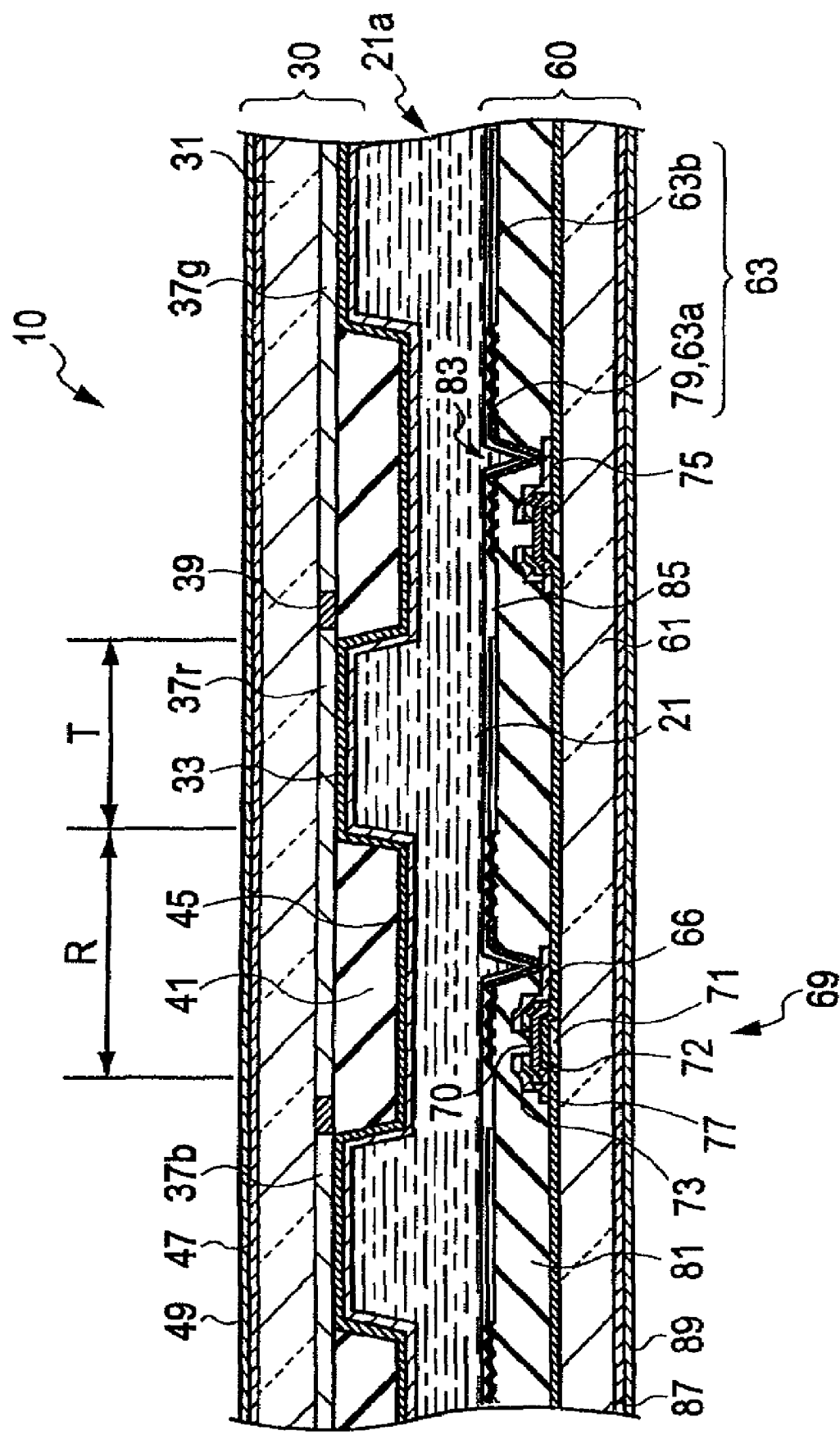

LIQUID CRYSTAL DEVICE, METHOD FOR MANUFACTURING LIQUID CRYSTAL DEVICE, AND ELECTRONIC APPARATUS

The entire disclosure of Japanese Patent Application No. 2006-080393, filed Mar. 23, 2006 is expressly incorporated by reference herein.

BACKGROUND

1. Technical Field

The present invention relates to liquid crystal devices, methods for manufacturing such liquid crystal devices, and electronic apparatuses. The present invention particularly relates to a liquid crystal device in which light sources are prevented from being misaligned with a light guide plate, a method for manufacturing such a liquid crystal device, and an electronic apparatus including such a liquid crystal device.

2. Related Art

Liquid crystal devices are known as electro-optical devices for displaying images. The liquid crystal devices each include a pair of substrates, opposed to each other, having electrodes. The liquid crystal devices display pictures or images including characters in such a manner that voltages are selectively applied to pixels corresponding to intersections of the electrodes and thereby light passing through a liquid crystal material contained in the pixels is modulated.

A transmissive liquid crystal device includes a lighting unit for transmissive display and a liquid crystal panel. The lighting unit includes a flexible printed circuit (FPC) board, a light source such as a light-emitting diode (LED), and a light guide plate. For the thickness or size reduction of the liquid crystal device, the light source is mounted on the FPC board and is placed near the edge of the light guide plate such that light emitted from the light source is guided to the liquid crystal panel.

JP-A-2002-98945 (hereinafter referred to as Patent Document 1) discloses a method for manufacturing a liquid crystal device including an FPC board. In the method, the following steps are combined into one: a step of fixing a light-shielding tape for preventing light from leaking from a light source and a step of fixing a double-faced adhesive tape for bonding a backlight and a liquid crystal panel together. Therefore, the method is efficient.

In particular, a light-shielding double-faced adhesive tape 200 is used in the method. With reference to FIG. 14, the light-shielding double-faced adhesive tape 200 includes a polyethylene terephthalate (PET) film 205 serving as a base, a light-shielding layer 204 lying on a face of the PET film 205, a first adhesive layer 203, and a second adhesive layer 206. The PET film 205 and the light-shielding layer 204 are sandwiched between the first and second adhesive layers 203 and 206. The light-shielding double-faced adhesive tape 200 is sandwiched between a first release sheet 202 and a second release sheet 207. The light-shielding double-faced adhesive tape 200 is used in a step of bonding a liquid crystal panel 210 to a light source unit 212.

Although the liquid crystal panel 210 is bonded to a light source unit 212 including the light source 213 with the light-shielding double-faced adhesive tape 200 and the light source unit 212 is electrically connected to an FPC board 293, no stress is generated in the FPC board 293. As shown in FIG. 15A, the liquid crystal panel 210 can therefore be held flat.

In FIGS. 15A and 15B, in order to provide a clear understanding of the arrangement of stacked members, the light-shielding double-faced adhesive tape 200 is shown so as to be in direct contact with a light source FPC board 217 and a light-reflecting plate or a light-reflecting film 216. However, there is a possibility that the light-shielding double-faced adhesive tape 200 cannot be seen in a sectional view like FIG. 15A or 15B depending on the width of the light-shielding double-faced adhesive tape 200 or the width of an end section (not shown) of a housing 202 in contact with the light-shielding double-faced adhesive tape 200.

In the liquid crystal device disclosed in Patent Document 1, the liquid crystal panel 210 is lifted by bending the FPC board 293 attached to the rear face of the liquid crystal panel 210 as shown in FIG. 15B.

That is, the light-shielding double-faced adhesive tape 200 is released from the liquid crystal panel 210 (particularly from the end section of the housing 202). This causes the light source FPC board 217 to be lifted in the direction indicated by Arrow A in FIG. 15B.

Therefore, the light source 213 is misaligned with a light guide plate 215. This can reduce the amount of light emitted from the light source 213 to the light guide plate 215 or can vary the intensity of light applied to the light guide plate 215. Therefore, the following problem is caused: a problem that the liquid crystal device displays an image with low or non-uniform brightness.

The lift of the light source 213 causes a problem that portions of the light source 213 are seen by observers. This problem is called hot spots.

An opening may be formed in the light-shielding double-faced adhesive tape 200 such that the light-shielding double-faced adhesive tape 200 is prevented from being bonded to the light source unit 212. However, this reduces the light-shielding ability of the light-shielding double-faced adhesive tape 200, that is, this causes the light-shielding double-faced adhesive tape 200 to be useless.

Another light-shielding double-faced adhesive tape having a large width, a large area, and/or high adhesive strength may be used to tightly bond the liquid crystal panel 210 to the end section of the housing 202. However, this does not comply with a requirement that the display area of the liquid crystal panel 210 is maximized. Furthermore, there is a problem in that this light-shielding double-faced adhesive tape is inferior in repairability.

Alternatively, a cover may be provided on the housing 202 such that the liquid crystal panel 210 is prevented from being lifted. However, this does not comply with requirements that the thickness of the liquid crystal device is minimized and the number of components of the liquid crystal device is also minimized.

SUMMARY

The inventors have made intensive studies to find that liquid crystal panels can be prevented from being lifted in such a manner that certain members (adhesion-preventing members) are provided in predetermined regions or such predetermined regions are subjected to certain treatment (adhesion-preventing treatment). In this manner, no upper covers are used and the following tapes are used: light-shielding double-faced adhesive tapes which have an area substantially the same as that of conventional ones and of which the type is substantially the same as that of conventional ones.

An advantage of an aspect of the invention is to provide a liquid crystal device in which a liquid crystal panel is prevented from being lifted and therefore light sources are prevented from being misaligned with a light guide plate. An advantage of another aspect of the invention is to provide a method for manufacturing such a liquid crystal device. An advantage of another aspect of the invention is to provide an electronic apparatus including such a liquid crystal device.

A first aspect of the present invention provides a liquid crystal device that includes a liquid crystal panel; light sources; a light guide plate, opposed to the light sources, for guiding light emitted from the light sources to the liquid crystal panel; a flexible printed circuit board electrically connected to the liquid crystal panel; and a housing accommodating the liquid crystal panel and the light guide plate. The flexible printed circuit board is fixed to the rear face of the light guide plate in such a state that the flexible printed circuit board is curved. The liquid crystal panel is fixed to the housing with a light-shielding double-faced tape placed outside a display region including a sub-region containing the light sources. The light sources are spaced from the light-shielding double-faced tape with an adhesion-preventing member disposed therebetween or adhesion-preventing treatment is performed.

Even if an external force is applied to the liquid crystal panel by bending the flexible printed circuit board, the adhesion-preventing member or the adhesion-preventing treatment prevents the liquid crystal panel from being lifted. This prevents the light sources from misaligned with the light guide plate.

Since the liquid crystal panel can be prevented from being lifted, the liquid crystal device hardly displays an image with low or nonuniform brightness.

The term "a light-shielding double-faced tape placed outside a display region including a sub-region containing the light sources" means that the light-shielding double-faced tape extends from one of the light sources that is located near one end of the liquid crystal panel to another one of the light sources that is located near the other end thereof, that is, the light-shielding double-faced tape is located at a position suitable for shielding light.

In the liquid crystal device, the light sources are preferably mounted on a light source-driving circuit board different from the flexible printed circuit board and the light-shielding double-faced tape is preferably prevented from adhering to the light source-driving circuit board with the adhesion-preventing member or by the adhesion-preventing treatment.

This configuration allows the light sources to be readily aligned with the light guide plate and also allows the light sources to be readily supplied with electric power and to be readily replaced with new ones.

In the liquid crystal device, the adhesion-preventing member preferably includes an electrically insulating film.

The electrically insulating film, which may be made of PET, prevents electric wires from being short-circuited and also prevents the light sources from being misaligned with the light guide plate.

In the liquid crystal device, the adhesion-preventing member preferably includes portions of release members attached to the light-shielding double-faced tape.

Since the release member portions can be used for the adhesion-preventing member, the liquid crystal device can be manufactured at low cost. The effective use of the release members, which are usually discarded, is environmentally friendly.

In the liquid crystal device, the adhesion-preventing member preferably has raised portions and recessed portions.

This configuration allows the adhesion-preventing member to be in point contact with the light-shielding double-faced tape; hence, the adhesion-preventing member can be prevented from being bonded to the adhesion-preventing member.

In the liquid crystal device, the adhesion-preventing member preferably has positioning portions.

This configuration is effective in controlling the movement of the adhesion-preventing member and effective in preventing the misalignment of the light sources with the light guide plate.

In the liquid crystal device, the adhesion-preventing treatment is preferably silicone treatment or fluorine treatment.

This is because an adhesion-preventing function can be achieved using a reliable release agent. The use of such a release agent leads to a reduction in the thickness of the liquid crystal device.

In the liquid crystal device, the adhesion-preventing treatment is preferably to remove an adhesive from the light-shielding double-faced tape.

This is because the adhesion-preventing function can be readily achieved. The adhesive may be completely or partly removed.

A second aspect of the present invention provides a method for manufacturing a liquid crystal device including a liquid crystal panel; light sources; a light guide plate, opposed to the light sources, for guiding light emitted from the light sources to the liquid crystal panel; a flexible printed circuit board electrically connected to the liquid crystal panel; and a housing accommodating the liquid crystal panel and the light guide plate. The method includes fixing the liquid crystal panel to the housing with a light-shielding double-faced tape placed outside a display region including a sub-region containing the light sources, providing an adhesion-preventing member between the light-shielding double-faced tape and the light sources or performing adhesion-preventing treatment, and bending the flexible printed circuit board to fix the flexible printed circuit board to the rear face of the light guide plate.

In the liquid crystal device manufactured by the method, even if an external force is applied to the liquid crystal panel by bending the flexible printed circuit board, the adhesion-preventing member or the adhesion-preventing treatment prevents the liquid crystal panel from being lifted. This prevents the light sources from misaligned with the light guide plate and allows the liquid crystal device to be manufactured at low cost.

The liquid crystal device manufactured by the method hardly displays an image with low or nonuniform brightness and hardly has hot spots.

A third aspect of the present invention provides an electronic apparatus including that liquid crystal device.

BRIEF DESCRIPTION OF THE DRAWINGS

The invention will be described with reference to the accompanying drawings, wherein like numbers reference like elements.

FIG. 2 is a partial sectional view of a liquid crystal panel included in the liquid crystal device of the first embodiment.

DESCRIPTION OF EXEMPLARY EMBODIMENTS

Embodiments of the present invention will now be described in detail with reference to the accompanying drawings. The embodiments are for exemplification only and should not be construed as limitative. Various modifications may be made within the scope of the present invention.

First Embodiment

Figure 1A:
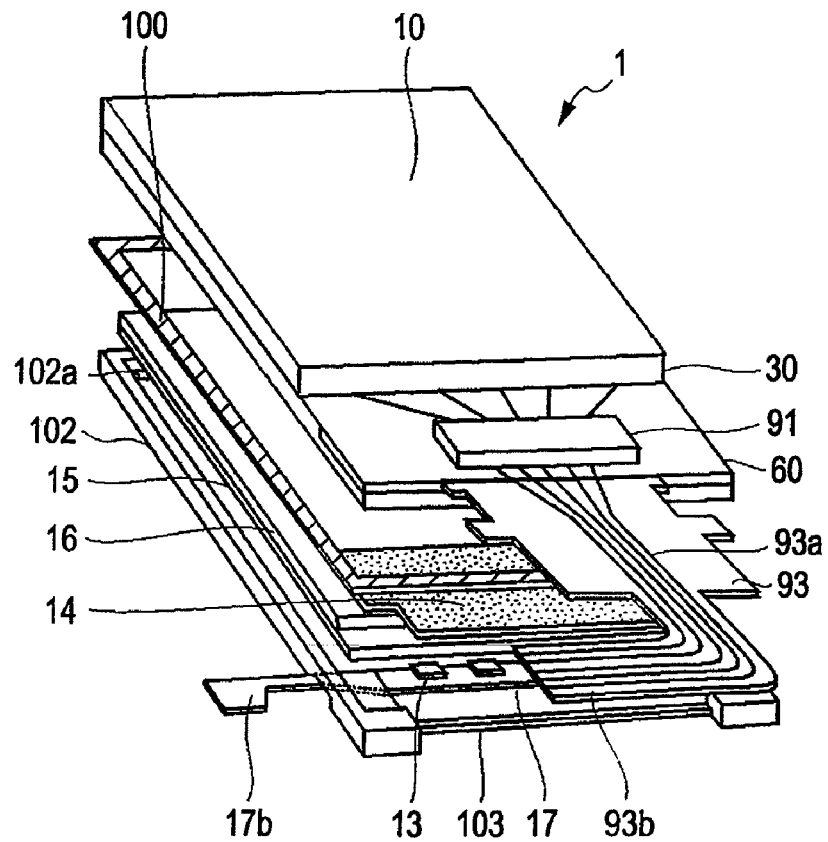
FIG. 1A is a perspective view of a liquid crystal device according to a first embodiment of the present invention and FIG. 1B is a partial sectional view of the liquid crystal device.
Figure 1B:
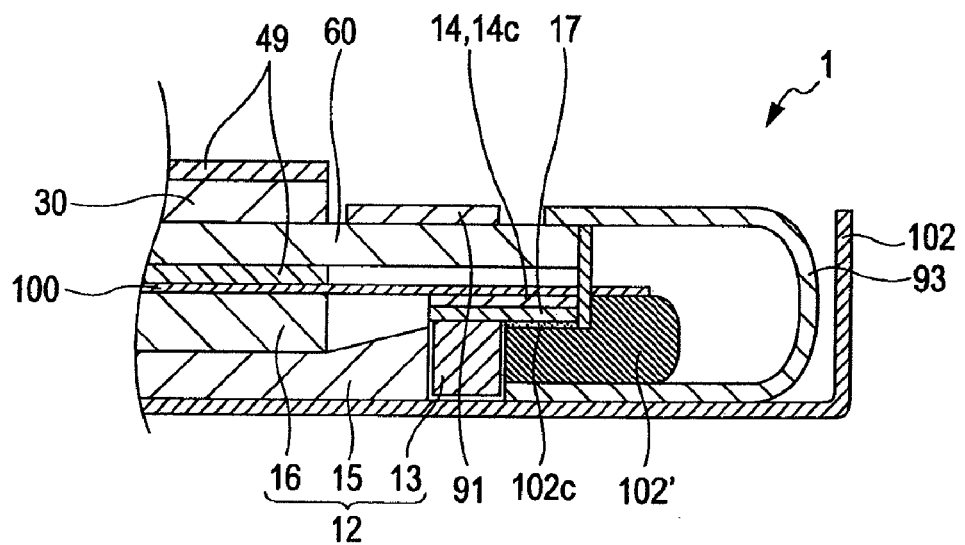

FIGS. 1A and 1B show a liquid crystal device 1 according to a first embodiment of the present invention. The liquid crystal device 1 includes a liquid crystal panel 10; light sources 13; a light guide plate 15, opposed to the light sources 13, for guiding light emitted from the light sources 13 to the liquid crystal panel 10; a flexible printed circuit board 93 electrically connected to the liquid crystal panel 10; and a housing 102 accommodating the liquid crystal panel 10 and the light guide plate 15. The flexible printed circuit board 93 is fixed to the rear face of the light guide plate 15 in such a state that the flexible printed circuit board 93 is curved. The liquid crystal panel 10 is fixed to the housing 102 with a light-shielding double-faced tape 100 placed outside a display region including a sub-region containing the light sources 13. An adhesion-preventing member 14 is disposed between the light-shielding double-faced tape 100 and the light sources 13 or adhesion-preventing treatment is performed.

The liquid crystal device 1 is a type of active matrix liquid crystal device including thin-film transistors (TFTs). The present invention is not limited to active matrix liquid crystal devices including TFTs and can be applied to various electro-optical devices such as active matrix liquid crystal devices including thin-film diodes (TFDs) and passive matrix liquid crystal devices including no switching elements.

In descriptions below, the term "liquid crystal panel" means a unit including a pair of substrates bonded to each other with a sealing member and a liquid crystal material sandwiched between the substrates and the term "liquid crystal device" means a device including a liquid crystal panel, a flexible printed circuit board, electronic components, and a light source, the flexible printed circuit board, the electronic components, and the light source being attached to the liquid crystal panel. In the accompanying drawings, the same members have the same reference numerals and will not be described in detail. Some of the members are not shown in the accompanying drawings.

Figure 3:
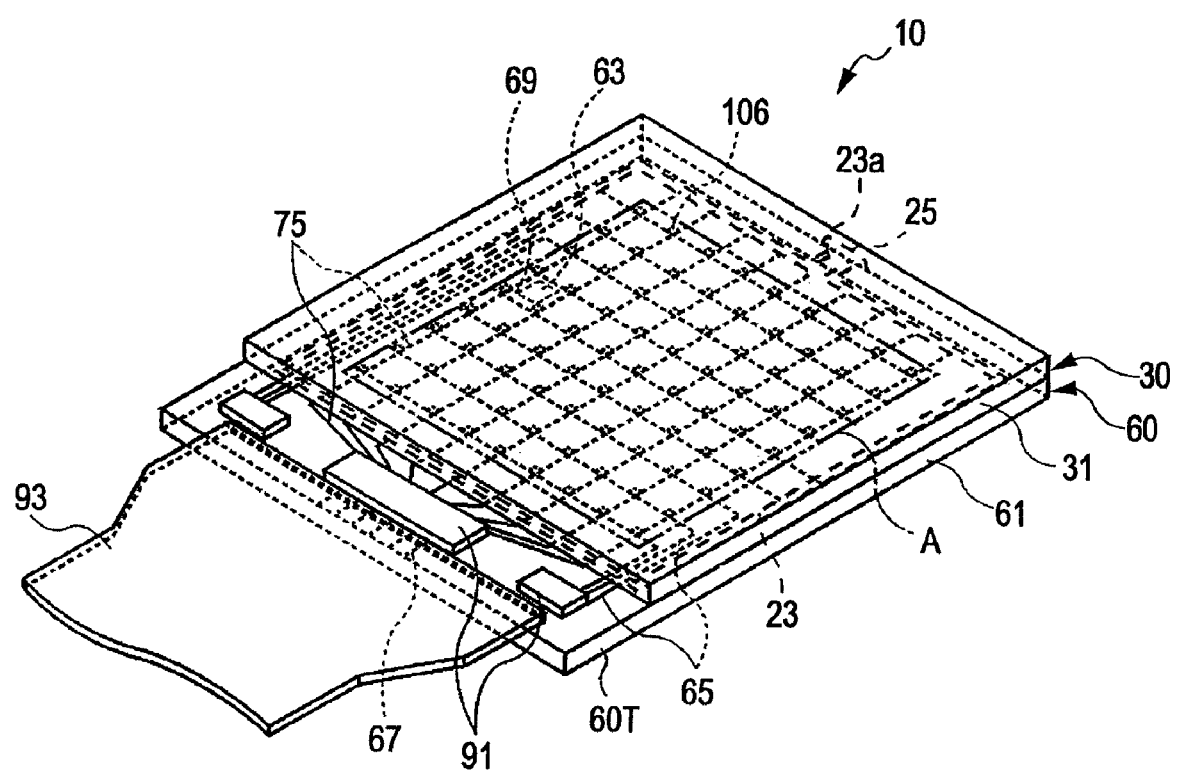
FIG. 3 is a perspective view of a liquid crystal panel.

The configuration of the liquid crystal device 1 will first be described. FIG. 2 shows the liquid crystal panel 10 in partial cross section. FIG. 3 shows the liquid crystal panel 10 in perspective view.

With reference to FIG. 2, the liquid crystal panel 10 includes a counter substrate 30, an element substrate 60, and a liquid crystal material 21. End portions of the counter and element substrates 30 and 60 are bonded to each other with a sealing member 23. The liquid crystal material 21 is placed in a space surrounded by the counter and element substrates 30 and 60 and the sealing member 23. In the liquid crystal panel 10, the element substrate 60 has a protruding section 60T extending out of the counter substrate 30. External connection terminals (not shown) are arranged on a face of the protruding section 60T that is directed to the liquid crystal material 21. The external connection terminals are connected to semiconductor elements 91 and the flexible printed circuit board 93.

With reference to FIG. 2, the counter substrate 30 includes a first base sheet 31 made of glass, plastic, or the like; first colored layers 37r; second colored layers 37g; third colored layers 37b; a light-shielding layer 39; a counter electrode 33 underlying the first, second, and third colored layers 37r, 37g, and 37b; a first alignment layer 45 underlying the counter electrode 33; and insulating layers 41 for optimizing retardation. The first, second, and third colored layers 37r, 37g, and 37b are arranged on the first base sheet 31 and function as color filters. The insulating layers 41 are located in respective reflective regions R and each sandwiched between the counter electrode 33 and one of the first, second, and third colored layers 37r, 37g, and 37b.

The counter electrode 33 is made of indium tin oxide (ITO), is a type of planar electrode, and extends over the first base sheet 31. The first, second, and third colored layers 37r, 37g, and 37b each include a red, green, or blue filter element or a cyan, magenta, or yellow filter element. The light-shielding layer 39 is called a black mask or a black matrix and has portions which are next to the first, second, and third colored layers 37r, 37g, and 37b and which are located at positions that are not opposed to pixel electrodes 63.

The element substrate 60 includes a second base sheet 61 made of glass, plastic, or the like; TFTs 69 which are arranged on the second base sheet 61 and which serve as active elements or switching elements; a transparent organic insulating layer 81; and the pixel electrodes 63 arranged above the TFTs 69 with the organic insulating layer 81 disposed therebetween.

The pixel electrodes 63 have reflective electrode portions 63a, located in the respective reflective regions R, for performing reflective display and transparent electrode portions 63b, located in respective transmissive regions T next to the reflective regions R, made of ITO. The reflective electrode portions 63a may be referred to as light-reflective layers 79.

The reflective electrode portions 63a are made of, for example, a light-reflective material such as aluminum (Al) or silver (Ag). The pixel electrodes 63 are overlaid with a second alignment layer 85 made of a polymer such as polyimide. The second alignment layer 85 is subjected to alignment treatment or rubbed.

With reference to FIG. 2, a first retardation film 47 and a first polarizing film 49 are arranged on the upper face of the counter substrate 30 in that order. A second retardation film 87 and a second polarizing film 89 are arranged on the lower face of the element substrate 60 in that order. A backlight unit (not shown) is disposed under the element substrate 60.

The TFTs 69 include gate electrodes 71 arranged on the second base sheet 61, portions of a gate insulating layer 72 extending over the gate electrodes 71 and second base sheet 61, semiconductor layers 70 disposed above the gate electrodes 71 with the gate insulating layer 72 extending therebetween, contact electrodes 77, source electrodes 73 each located on one side of each semiconductor layer 70 with each contact electrode 77 disposed therebetween, and drain electrodes 66 each located on the other side of the semiconductor layer 70 with each contact electrode 77 disposed therebetween.

The gate electrodes 71 extend from gate bus lines (not shown) and the source electrodes 73 extend from source bus lines (not shown). The gate bus lines extend in the transverse direction of the element substrate 60 and are arranged in parallel at constant intervals in the longitudinal direction thereof. The source bus lines extend in the longitudinal direction of the element substrate 60 and are arranged in parallel at constant intervals in the transverse direction thereof. The gate insulating layer 72 is sandwiched between the gate bus lines and the source bus lines.

The gate bus lines are connected to a liquid crystal-driving IC (not shown) and function as, for example, scanning lines. The source bus lines are connected to another driving IC (not shown) and function as, for example, signal lines.

The pixel electrodes 63 are located in sub-regions, included in square regions partitioned by the gate and source bus lines intersecting with each other, other than sub-regions corresponding to the TFTs 69.

The gate bus lines and the gate electrodes 71 may be made of, for example, chromium, tantalum, or the like. The gate insulating layer 72 may be made of, for example, silicon nitride ($SiN_x$), silicon oxide ($SiO_x$), or the like.

The semiconductor layers 70 may be made of, for example, doped amorphous silicon (a-Si), polysilicon, cadmium selenide (CdSe), or the like.

The contact electrodes 77 may be made of, for example, a-Si or the like. The source electrodes 73, the source bus lines, and the drain electrodes 66 may be made of, for example, titanium, molybdenum, aluminum, or the like.

The organic insulating layer 81 extends over the second base sheet 61 so as to cover the gate bus lines, the source bus lines, and the TFTs 69. The organic insulating layer 81 has contact holes 83 located at positions corresponding to the drain electrodes 66. The pixel electrodes 63 are electrically connected to the drain electrodes 66 through the contact holes 83.

The organic insulating layer 81 has resin films, located at positions corresponding to the reflective regions R, for scattering light. The resin films have an irregular pattern of peaks and valleys regularly or irregularly arranged. This allows the light-reflective layers 79 (or the reflective electrode portions 63a) overlying the organic insulating layer 81 to have an irregular pattern, similar to the above one, for reflecting light. However, there are no irregular patterns in the transmissive regions T such that a large amount of light can pass through the transmissive regions T.

When the liquid crystal device 1, which includes the liquid crystal panel 10 having the above configuration, displays an image in a reflective display mode, external light such as sunlight or lamplight is applied to the counter substrate 30 so as to pass through the first, second, and third colored layers 37r, 37g, and 37b to reach the light-reflective layers 79, reflected by the light-reflective layers 79 to pass through the first, second, and third colored layers 37r, 37g, and 37b, and then emitted outside through the counter substrate 30.

On the other hand, when the liquid crystal device 1 displays an image in a transmissive display mode, the backlight unit is turned on and light emitted from the backlight unit passes through the transparent electrode portions 63b, further passes through the first, second, and third colored layers 37r, 37g, and 37b, and the liquid crystal material 21, and then travels out of the liquid crystal device 1.

A light source unit 12 will now be described with reference to FIGS. 1B, 4A, and 4B. The light source unit 12 is a component emitting light applied to the liquid crystal panel 10 and may be referred to as a backlight unit.

With reference to FIG. 1B, the light source unit 12 includes the light sources 13 that emit light to be applied to the liquid crystal panel 10, a light source-driving circuit board 17 on which the light sources 13 are mounted, the light guide plate 15 guiding light emitted from the light sources 13 to the liquid crystal panel 10, and a light-reflective film 16 for applying light guided by the light guide plate 15 to the liquid crystal panel 10 with high efficiency and directivity.

In FIG. 1B, in order to provide a clear understanding of the arrangement of stacked members, the light-shielding double-faced tape 100 is shown so as to be in direct contact with the sealing section 16, the light source-driving circuit board 17, and a portion 102' of the housing 102. However, there is a possibility that the light-shielding double-faced tape 100 cannot be seen in a sectional view like FIG. 1B depending on the width of the light-shielding double-faced tape 100 or the width of an end section (not shown) of the housing 102 in contact with the light-shielding double-faced tape 100.

The light sources 13, which are included in the light source unit 12, are usually LEDs. The light guide plate 15 is a flat transparent member made of an acrylic resin. As shown in FIG. 1B, the light-reflective film 16 is disposed on the rear face of the light guide plate 15 that is opposite to the liquid crystal panel 10.

The light source-driving circuit board 17 is a type of flexible printed circuit board and includes a flexible sheet made of, for example, polyimide or the like. With reference to FIGS. 4A and 4B, the light sources 13 are arranged near one end portion of the light source-driving circuit board 17 and terminals 17b connected to connectors arranged on the flexible printed circuit board 93 are arranged near the other end portion thereof. The light sources 13 are electrically connected to the terminals 17b with a wiring pattern 17a.

Figure 4A:
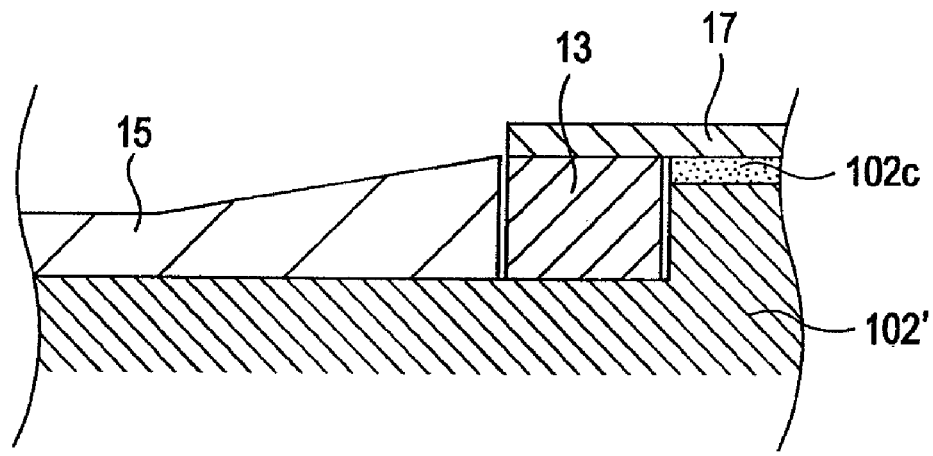
FIG. 4A is a partial sectional view of a light source unit emitting light applied to the liquid crystal panel and FIG. 4B is a plan view of a light source-driving circuit board included in the light source unit.
Figure 4B:
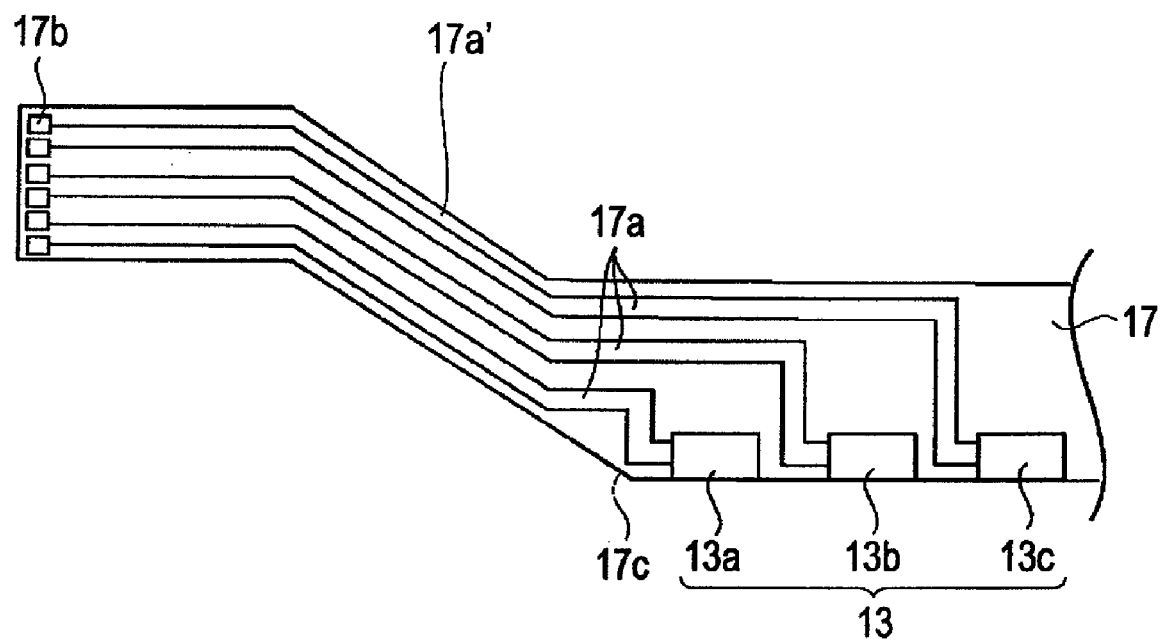

As shown in FIG. 4B, the light source-driving circuit board 17 may have a diagonal wiring portion 17a' for alignment or usability improvement. The wiring pattern 17a is covered with an electrically insulating material, which is not shown, so as to be prevented from being short-circuited and so as to have high durability.

As shown in FIG. 4A, the light sources 13 mounted on the light source-driving circuit board 17 are arranged at predetermined positions located near one side of the light guide plate 15. The light source-driving circuit board 17 is fixed to the housing 102 and the light guide plate 15 with an adhesive 102c.

The flexible printed circuit board 93 will now be described in detail. The flexible printed circuit board 93 is used to supply electric power to the semiconductor elements 91 and other components to drive the liquid crystal panel 10. For space reduction and wiring, the flexible printed circuit board 93 is electrically connected to the liquid crystal panel 10 in such a state that the flexible printed circuit board 93 is bent as shown in FIG. 1A.

As described in Related Art, there is a problem in that the bending of the FPC board 293 attached to the rear face of that liquid crystal panel 210 causes that liquid crystal panel 210 to be lifted and therefore the light source FPC board 217 is lifted.

In order to prevent such a problem, the adhesion-preventing member 14 is disposed between the light-shielding double-faced tape 100 and the light sources 13 or adhesion-preventing treatment is performed.

The flexible printed circuit board 93 may have any configuration and typically includes an electrically insulating sheet made of polyimide or the like and electric wires 93a which are made of metal such as copper and which are arranged on the electrically insulating sheet.

The flexible printed circuit board 93 further includes terminals 93b, which are not shown. In usual, the terminals 93b are electrically connected to a power supply for supplying power to the liquid crystal device 1.

The housing 102 will now be described in detail. As shown in FIG. 1A, the housing 102 is a member for accommodating the liquid crystal panel 10 and may have any form depending on the form of the liquid crystal panel 10.

The housing 102 usually accommodates the light source unit 12 and a portion of the flexible printed circuit board 93 in addition to the liquid crystal panel 10.

In order to fix the liquid crystal panel 10 to the housing 102, the light-shielding double-faced tape 100 is placed around the housing 102 so as not cover the display region A. This allows an edge portion 102a of the housing 102 to be bonded or fixed to an end portion of the liquid crystal panel 10.

There is a technical need to maximize the area of the display region A without increasing the size of the liquid crystal panel 10. Therefore, the edge portion 102a of the housing 102 preferably has a width of 3 mm or less and more preferably 2 mm or less.

There is a possibility that another light-shielding double-faced tape having an increased width or area or enhanced adhesion is used to tightly fix the liquid crystal panel 10 to the housing 102. However, such a light-shielding double-faced tape is not practical and is inferior in repairability.

Figure 14:
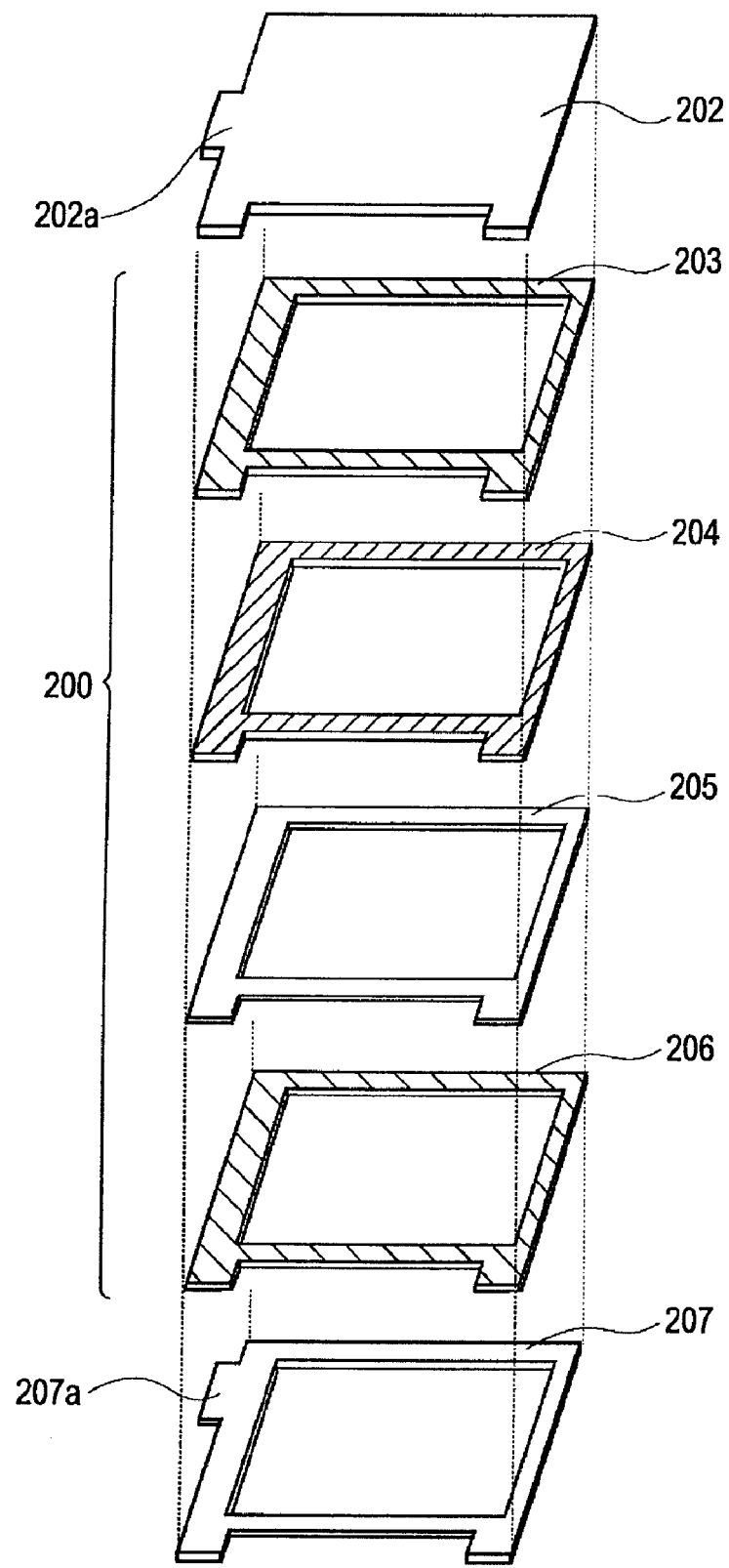
FIG. 14 is an illustration of a light-shielding double-faced adhesive tape included in a conventional liquid crystal device.
Figure 15A:
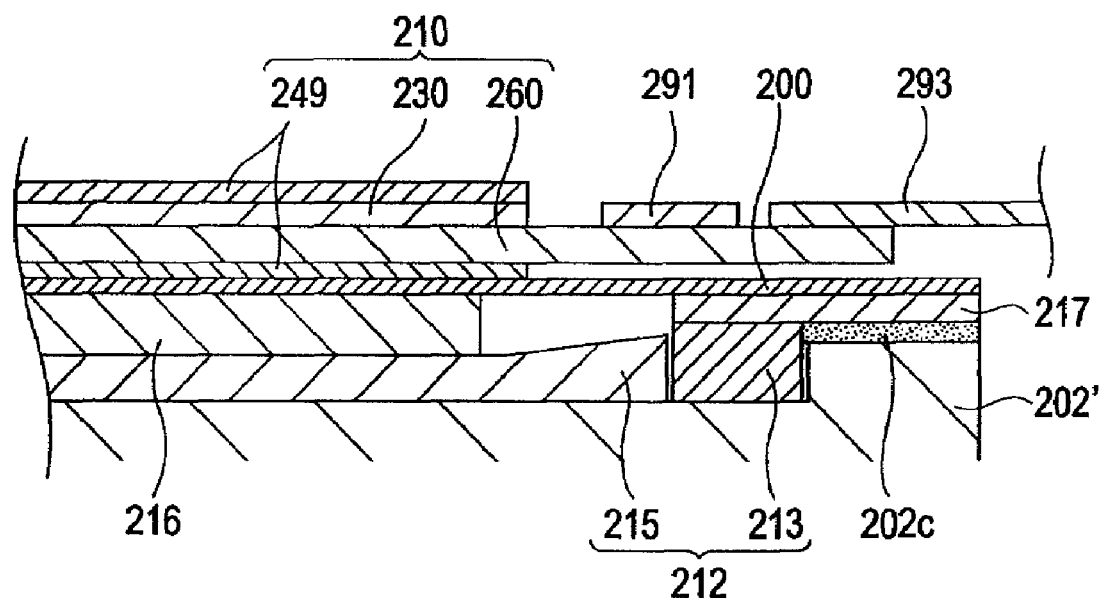
FIGS. 15A and 15B are sectional views illustrating a problem that a liquid crystal panel included in the conventional liquid crystal device is lifted.
Figure 15B:
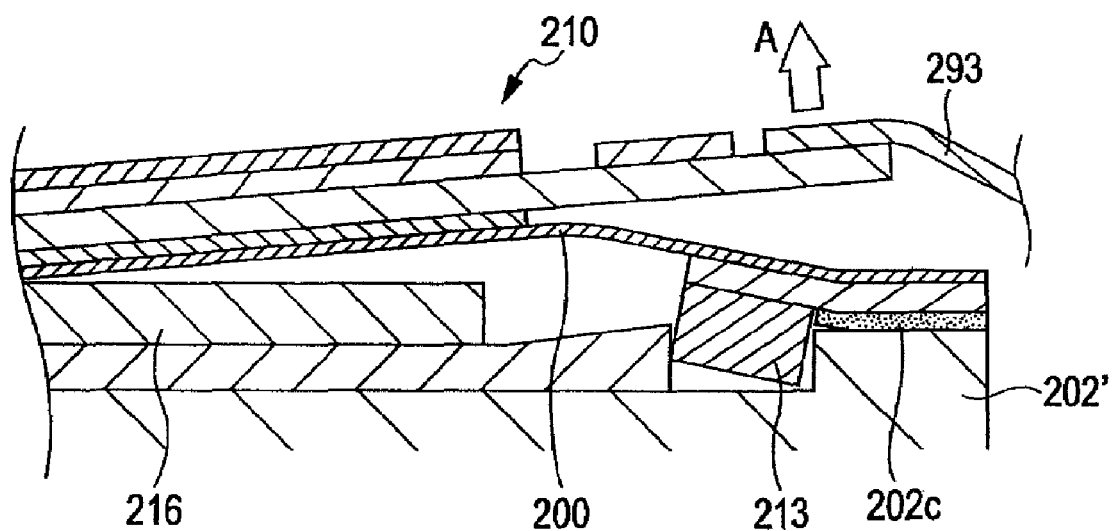

The light-shielding double-faced tape 100 is made of an adhesive resin such as an acrylic adhesive resin, a urethane adhesive resin, a rubber adhesive resin, or a polyester adhesive resin and an additive such as carbon black, a black pigment, metal powder, or filler. The light-shielding double-faced tape 100 may have a multilayer structure as shown in FIG. 14.

With reference to FIG. 1B, the adhesion-preventing member 14 is disposed between the light-shielding double-faced tape 100 and the light sources 13. The adhesion-preventing member 14 may be subjected to adhesion-preventing treatment such that a first adhesion-preventing portion 14d is formed.

This is because the light sources 13 are not bonded to the light-shielding double-faced tape 100 and therefore are prevented from being misaligned with the light guide plate 15.

That is, the bending of the flexible printed circuit board 93 applies an external force to the liquid crystal panel 10 in a certain direction to release the light-shielding double-faced tape 100 from the liquid crystal panel 10. This causes the liquid crystal panel 10 to be lifted; however, the light sources 13 are prevented from being lifted together with the liquid crystal panel 10.

Even if the light-shielding double-faced tape 100 is released from the liquid crystal panel 10 and therefore the liquid crystal panel 10 is lifted, the light sources 13 are not lifted and are therefore prevented from being misaligned with the light guide plate 15. Hence, the liquid crystal device 1 hardly displays an image with low or nonuniform brightness and hardly has hot spots.

In the case where the adhesion-preventing member 14 is used, even if the light-shielding double-faced tape 100 is released from the liquid crystal panel 10 by the application of an external force to the liquid crystal panel 10 and therefore the liquid crystal panel 10 is lifted, the light sources 13 can stay at their positions although the adhesion-preventing member 14 is lifted together with the light-shielding double-faced tape 100.

It is known that an image displayed by the liquid crystal device 1 has seriously low brightness depending on the size of thickness of the liquid crystal panel 10 when the alignment shift between the light guide plate 15 and the light sources 13 ranges from 500 to 1,000 μm. However, the alignment shift between the light guide plate 15 and the light sources 13 can be controlled to be less than 500 μm or less than 100 μm depending on conditions.

The adhesion-preventing member 14 shown in FIG. 1B preferably includes an electrically insulating film.

This is because electric wires can be prevented from being short-circuited and the light sources 13 can be prevented from being misaligned with the light guide plate 15.

Examples of the electrically insulating film include polyester films such as PET films, fluorocarbon polymer films, acrylic resin films, polyolefin films, polyurethane films, epoxy resin films, polyimide films, polysulfone films, polyphenylene sulfide films, and phenol resin films.

The electrically insulating film preferably has a thickness of 1 to 500 μm.

When the electrically insulating film has a thickness of less than 1 μm, the electrically insulating film is difficult to handle and/or has insufficient electrically insulating properties and mechanical properties. In contrast, when the electrically insulating film has a thickness of greater than 500 μm, the adhesion-preventing member 14 cannot be readily provided between the light sources 13 and the light guide plate 15 or is readily displaced from its initial position.

Therefore, the electrically insulating film more preferably has a thickness of 5 to 100 μm and further more preferably 15 to 75 μm.

The electrically insulating film may contain titanium oxide or may include a light-shielding surface layer such that the electrically insulating film has enhanced light-shielding properties. This prevents the malfunction of the liquid crystal device 1 and reduces the influence of external light on the liquid crystal device 1.

Alternatively, portions 100c of release members attached to the light-shielding double-faced tape 100 may be used instead of the adhesion-preventing members 14.

If the release member portions 100c are used instead of the adhesion-preventing members 14, the release members need not be wasted or the electrically insulating film need not be prepared. This is cost-effective.

The release members are usually arranged on both faces of the light-shielding double-faced tape 100. After one of the release members are removed from the light-shielding double-faced tape 100, the light-shielding double-faced tape 100 is attached to the liquid crystal panel 10 and the other one is then partly removed therefrom such that the release member portions 100c remains on the light-shielding double-faced tape 100. The remaining release member portions 100c need not be wasted but can be used as well as the adhesion-preventing member 14. Hence, at least one of the release members preferably has scored lines or perforated lines located at predetermined positions.

Figure 5A:
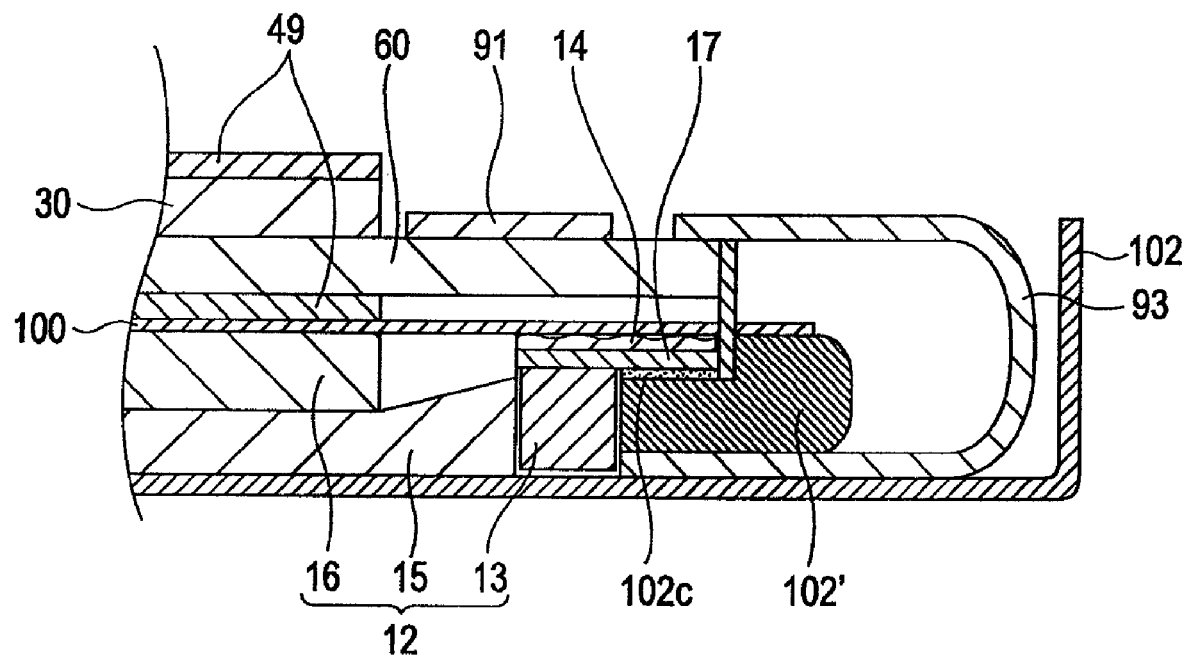
FIG. 5A is a partial sectional view of the liquid crystal panel fixed to a housing with a light-shielding double-faced tape and FIG. 5B is a sectional view of an example of an adhesion-preventing member.
Figure 5B:
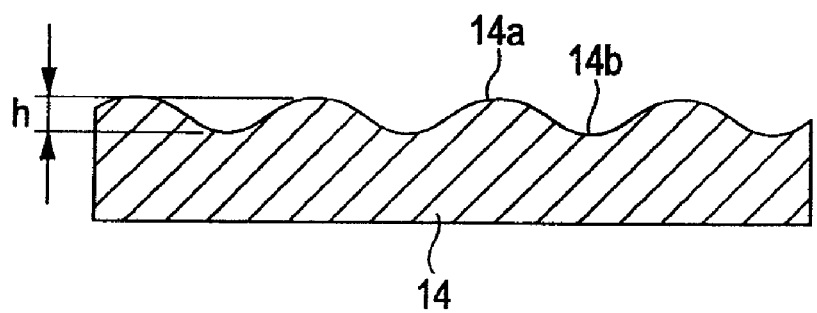

Alternatively, the adhesion-preventing member 14 may have raised portions 14a and recessed portions 14b as shown in FIGS. 5A and 5B. FIG. 5A shows a state that the adhesion-preventing member 14 is disposed between the light source-driving circuit board 17 and the light-shielding double-faced tape 100. FIG. 5B shows the raised and recessed portions 14a and 14b of the adhesion-preventing member 14 in enlarged view.

The presence of the raised and recessed portions 14a and 14b allows the adhesion-preventing member 14 to be in point contact with the light-shielding double-faced tape 100. Therefore, the adhesion-preventing member 14 can be readily provided between the light source-driving circuit board 17 and the light-shielding double-faced tape 100.

Ordinary adhesion-preventing members include flat electrically insulating films such as flat PET films. Such a type of adhesion-preventing member cannot be readily provided between the light source-driving circuit board 17 and the light-shielding double-faced tape 100 or aligned therewith. Such an operation is particularly difficult when the light-shielding double-faced tape 100 has high adhesion.

The presence of the raised and recessed portions 14a and 14b reduces the friction between the adhesion-preventing member 14 and the light source-driving circuit board 17 or the light-shielding double-faced tape 100. This allows the adhesion-preventing member 14 to be readily provided between the light source-driving circuit board 17 and the light-shielding double-faced tape 100.

Since the adhesion-preventing member 14 is in point contact with the light-shielding double-faced tape 100, the contact area therebetween is small. This allows the adhesion-preventing member 14 to have an improved adhesion-preventing function.

In the case where adhesive properties of the light-shielding double-faced tape 100 are problematic when the adhesion-preventing member 14 is provided between the light source-driving circuit board 17 and the light-shielding double-faced tape 100, only one face of the adhesion-preventing member 14 may have the raised or recessed portions 14a or 14b.

The height of each raised portion 14a or the depth of each recessed portion 14b, that is, the distance from the peak of the raised portion 14a to the bottom of the recessed portion 14b is not particularly limited and is preferably within the range of about 0.1 to 100 µm.

When the height of the raised portion 14a or the depth of the recessed portion 14b is less than 0.1 µm, the friction between the adhesion-preventing member 14 and the light sources 13 or the light-shielding double-faced tape 100 cannot be reduced.

In contrast, when the height of the raised portion 14a or the depth of the recessed portion 14b is greater than 100 µm, it is difficult to uniformly form the raised and recessed portions 14a and 14b.

Therefore, the height of the raised portion 14a or the depth of the recessed portion 14b is more preferably within the range of about 1 to 50 µm and further more preferably about 5 to 30 µm.

If the adhesion-preventing member 14 has either the raised portions 14a or recessed portions 14, the distance from the top of each raised portion 14a or the bottom of each recessed portion 14b to a reference plane of the adhesion-preventing member 14 is preferably within the above range.

Figure 6A:
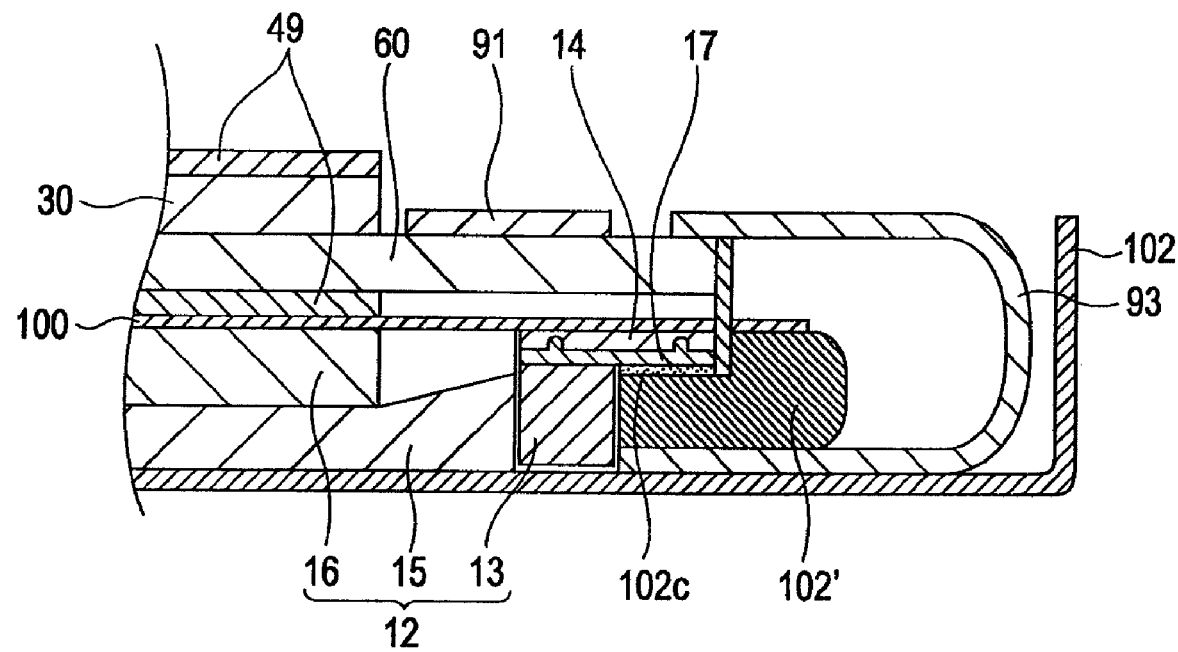
FIG. 6A is a partial sectional view of the liquid crystal panel fixed to the housing with the light-shielding double-faced tape and FIG. 6B is a sectional view of another example of the adhesion-preventing member.
Figure 6B:
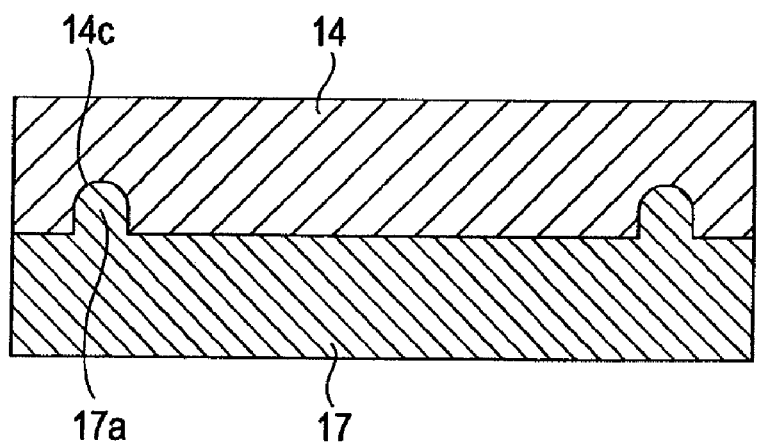

Alternatively, the adhesion-preventing member 14 preferably has positioning portions 14c as shown in FIGS. 6A and 6B. FIG. 6A shows a state that the adhesion-preventing member 14 is disposed between the light source-driving circuit board 17 and the light-shielding double-faced tape 100. FIG. 6B shows a state that the positioning portions 14c of the adhesion-preventing member 14 are engaged with portions of the light source-driving circuit board 17.

The positioning portions 14c are useful in controlling the movement of the adhesion-preventing member 14. The light source-driving circuit board 17 may have, for example, bumps 17a as shown in FIGS. 6A and 6B. The bumps 17a are engaged with the positioning portions 14c when the positioning portions 14c are recessed, whereby the movement of the adhesion-preventing member 14 can be controlled.

The positioning portions 14c may be recessed or raised. Alternatively, the adhesion-preventing member 14 may have positioning marks. Although the positioning marks have no function of controlling the movement of the adhesion-preventing member 14, the positioning marks are useful in positioning the adhesion-preventing member 14 if the adhesion-preventing member 14 is displaced from its initial position.

Figure 7A:
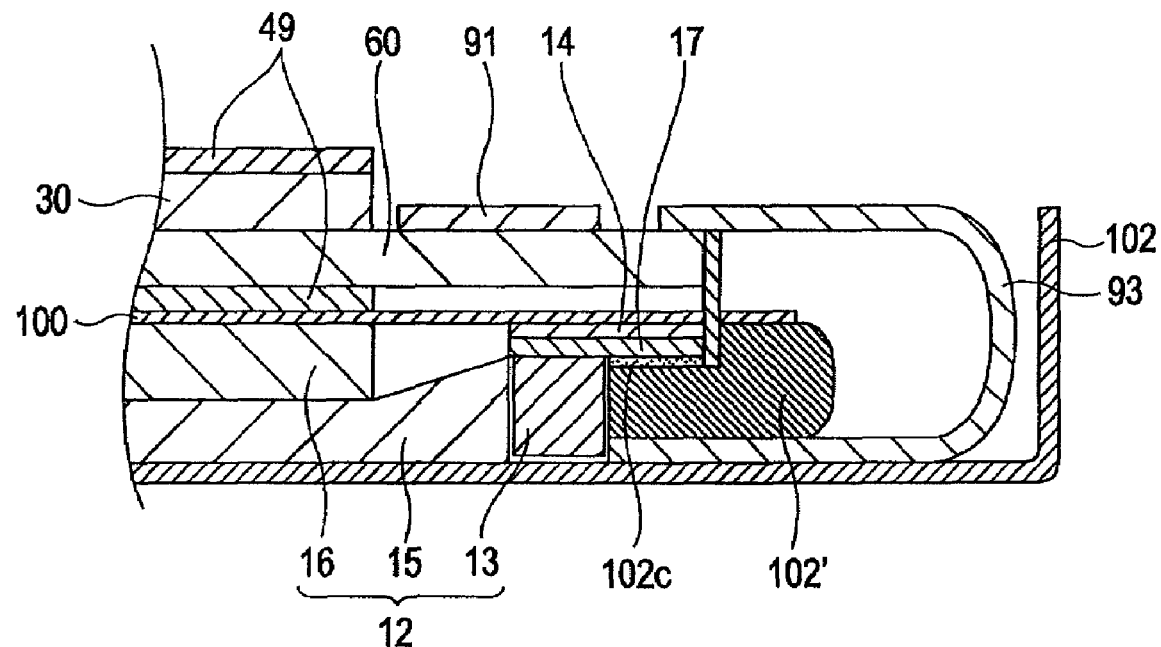
FIG. 7A is a partial sectional view of the liquid crystal panel fixed to the housing with the light-shielding double-faced tape and FIG. 7B is a sectional view of an example of the adhesion-preventing member subjected to adhesion-preventing treatment.
Figure 7B:
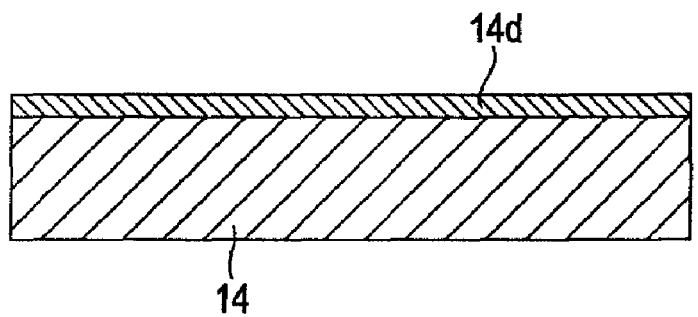

The adhesion-preventing member 14 is preferably subjected to adhesion-preventing treatment such as silicone treatment or fluorine treatment. That is, the adhesion-preventing member 14 is preferably subjected to adhesion-preventing treatment so as to have the first adhesion-preventing portion 14d as shown in FIGS. 7A and 7B. The first adhesion-preventing portion 14d may contain a silicone release agent or a fluoride release agent. FIG. 7A shows a state that the first adhesion-preventing portion 14d is disposed between the light source-driving circuit board 17 and the light-shielding double-faced tape 100. FIG. 7B shows the first adhesion-preventing portion 14d in enlarged view.

The silicone release agent and the fluoride release agent have been used in the tape industry for many years. Therefore, it is known that thin-films containing the silicone release agent or the fluoride release agent have an adhesion-preventing function. The first adhesion-preventing portion 14d may be formed at any position by a coating process, may have any shape, or may be patterned.

The silicone and fluoride release agents are not particularly limited. Examples of the silicone release agent include polydimethylsiloxanes, polymethylvinylsiloxanes, polymethylhydrogensiloxanes, polymethylhexenylsiloxanes, and dimethylsiloxane-methylhexenylsiloxane copolymers. Examples of the fluoride release agent include polytetrafluoroethylenes (PTFEs), tetrafluoroethylene-hexafluoropropylene copolymers (FEPs), tetrafluoroethylene-perfluoroalkyl vinyl ether copolymers (PFAs), and ethylene-tetrafluoroethylene copolymers (ETFE and PVdF). These polymers may be used alone or in combination.

Figure 8A:
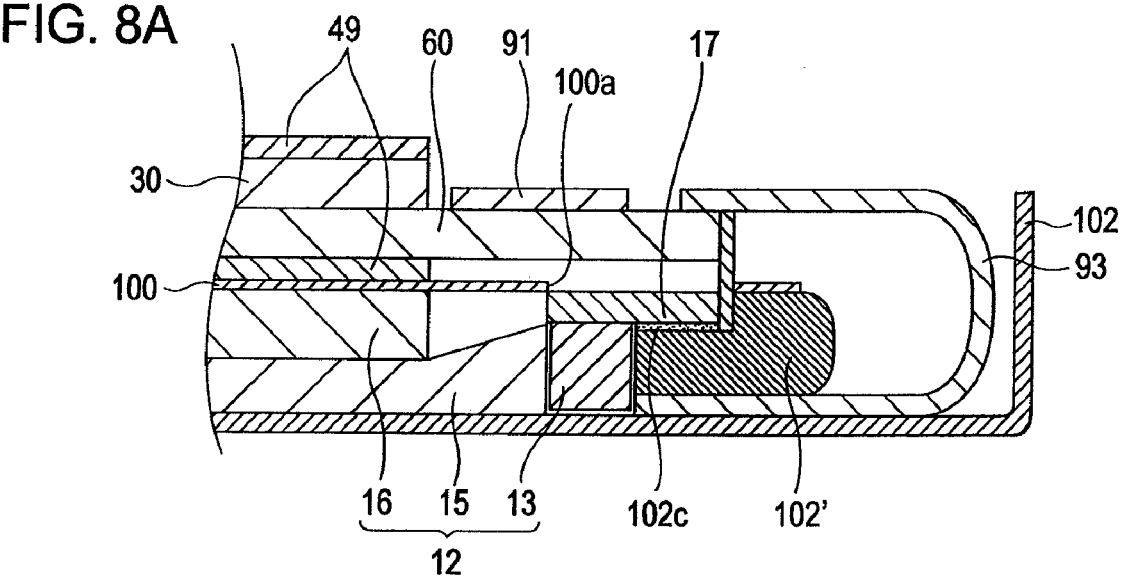
FIG. 8A is a partial sectional view of the liquid crystal panel fixed to the housing with the light-shielding double-faced tape and FIGS. 8B to 8D are sectional views of another example of the adhesion-preventing member subjected to adhesion-preventing treatment.
Figure 8B:
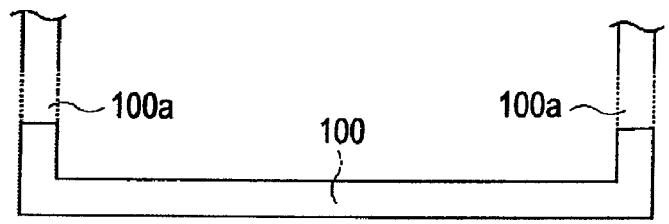

As shown in FIGS. 8A and 8B, the light-shielding double-faced tape 100 may have second adhesion-preventing portions 100a. The second adhesion-preventing portions 100a can be formed by subjecting the light-shielding double-faced tape 100 to adhesion-preventing treatment, that is, by removing an adhesive from predetermined regions of the light-shielding double-faced tape 100. FIG. 8A shows a state that the light-shielding double-faced tape 100 having the second adhesion-preventing portions 100a is disposed between the light source-driving circuit board 17 and the light sources 13. FIG. 7B shows the light-shielding double-faced tape 100 having the second adhesion-preventing portions 100a in plan view.

The second adhesion-preventing portions 100a have no adhesive and therefore have an adhesion-preventing function.

The adhesive may be partly removed from the light-shielding double-faced tape 100 or the light-shielding double-faced tape 100 may be partly removed as shown in FIGS. 8A and 8B. This prevents the adhesion of the light sources 13 to the light-shielding double-faced tape 100.

Figure 8C:
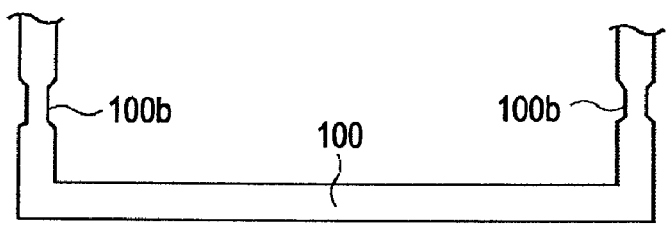

The adhesive or the light-shielding double-faced tape 100 may be partly removed such that the light sources 13 are not substantially in contact with any portions of the light-shielding double-faced tape 100. Alternatively, the light-shielding double-faced tape 100 may be partly reduced in width so as to have narrow portions 100b as shown in FIG. 8C. The light-shielding double-faced tape 100 may have openings (not shown).

Figure 8D:
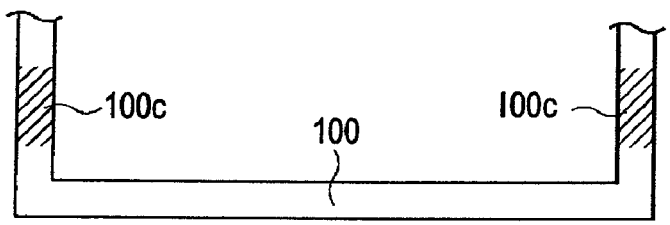

The release member portions 100c may be allowed to remain on predetermined regions of the light-shielding double-faced tape 100 as shown in FIG. 8D. The release member portions 100c serve as well as the second adhesion-preventing portions 100a.

Second Embodiment

A second embodiment of the present invention provides a method for manufacturing a liquid crystal device including a liquid crystal panel 10; light sources 13; a light guide plate 15, opposed to the light sources 13, for guiding light emitted from the light sources 13 to the liquid crystal panel 10; a flexible printed circuit board 93 electrically connected to the liquid crystal panel 10; and a housing 102 accommodating the liquid crystal panel 10 and the light guide plate 15. The method includes a step of fixing the liquid crystal panel 10 to the housing 102 with a light-shielding double-faced tape 100 placed outside a display region including a sub-region containing the light sources 13, a step of providing an adhesion-preventing member 14 between the light-shielding double-faced tape 100 and the light sources 13 or performing adhesion-preventing treatment; and a step of bending the flexible printed circuit board 93 and then fixing the flexible printed circuit board 93 to the rear face of the light guide plate 15.

The method will now be described in detail with reference to a flow chart shown in FIG. 9.

Figure 9:
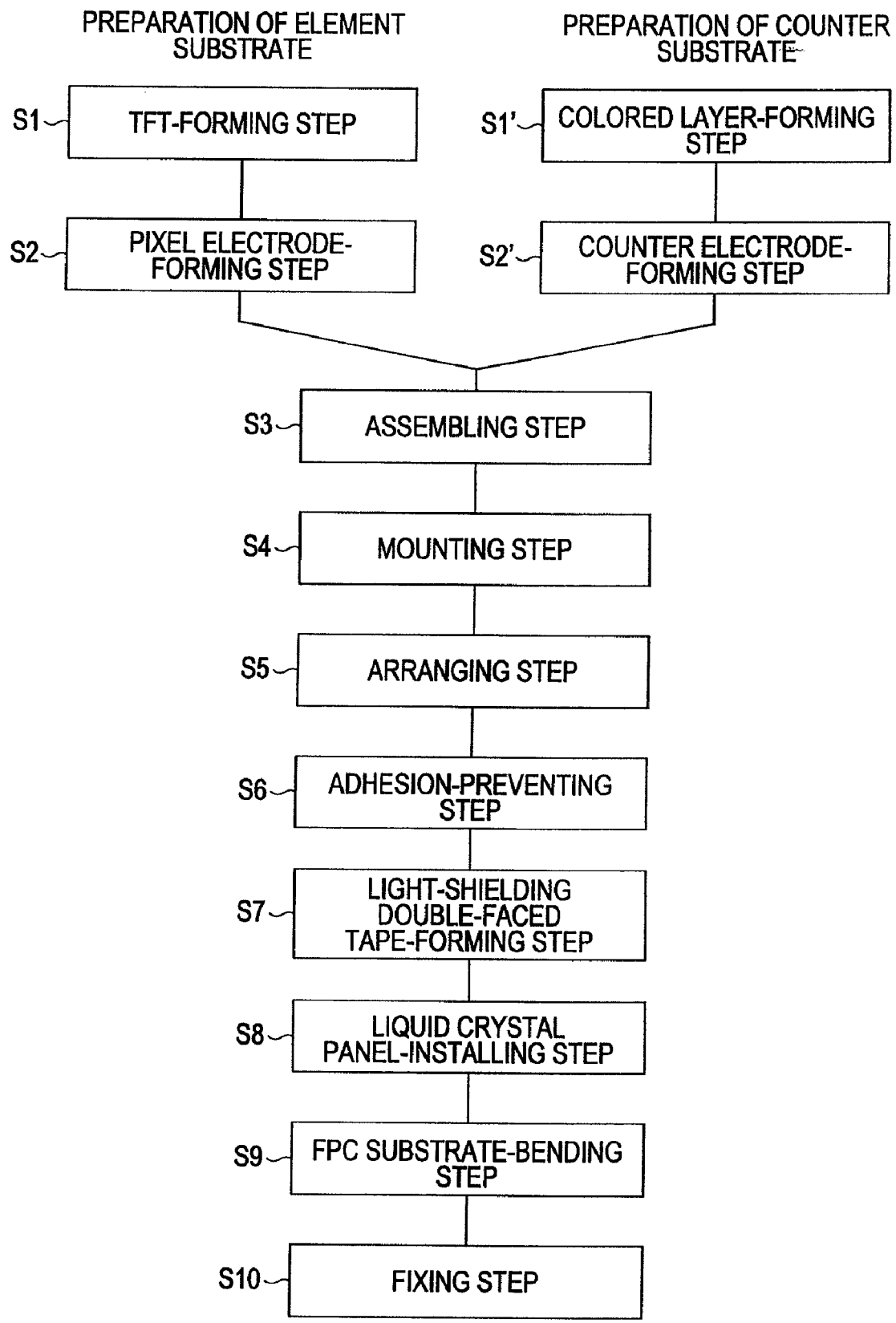
FIG. 9 is a flow chart illustrating a method for manufacturing a liquid crystal device according to a second embodiment of the present invention.

As shown in FIG. 9, the liquid crystal panel 10 is prepared. The liquid crystal panel 10 includes an element substrate 60, prepared through Step S1 and Step S2, including TFTs and a counter substrate 30, prepared through Step S1' and Step S2', serving as a color filter substrate.

Figure 10A:
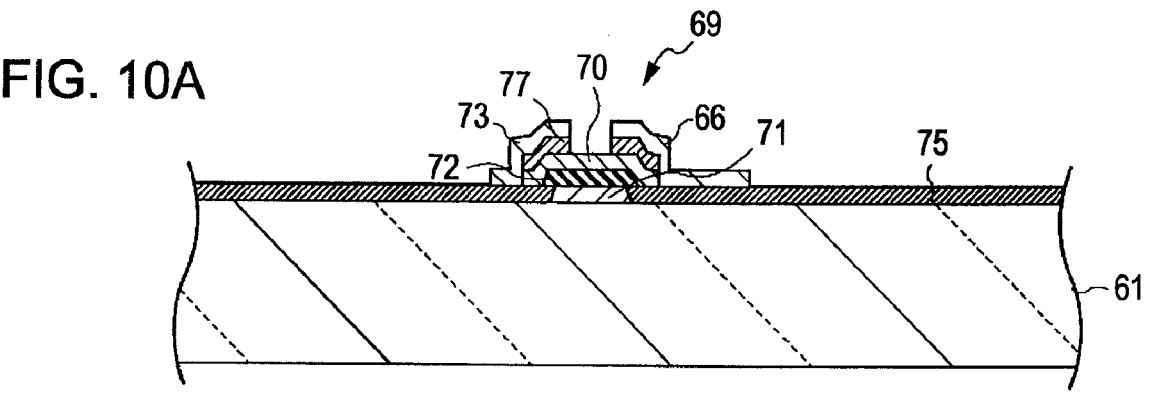
FIGS. 10A to 10C are sectional views illustrating a step of preparing an element substrate included in the liquid crystal device manufactured by the method.
Figure 10B:
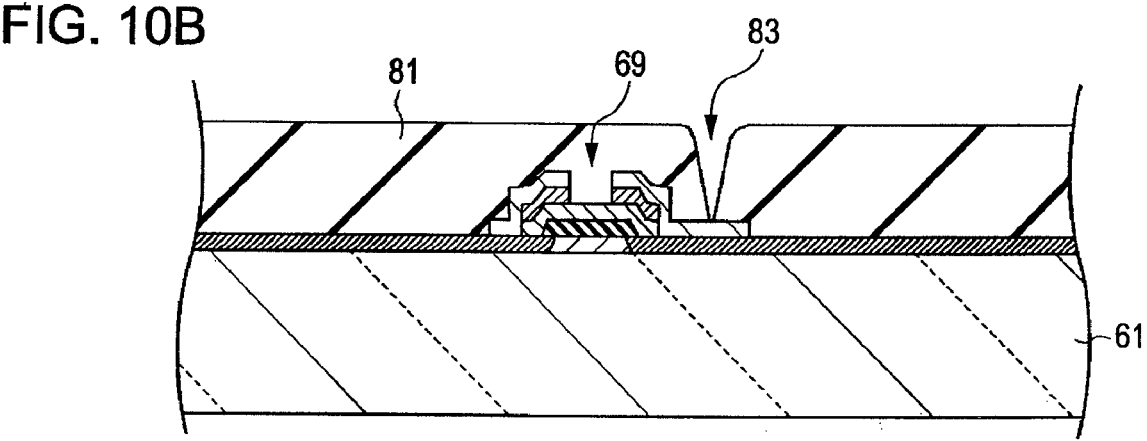

In particular, as shown in FIG. 10A, the following members are provided above a second base sheet 61, made of glass, for forming the element substrate 60: TFTs 69, scanning lines arranged in a predetermined pattern, data lines arranged in a predetermined pattern, and external connection terminals. As shown in FIG. 10B, an organic insulating layer 81 is formed over the above members.

Figure 10C:
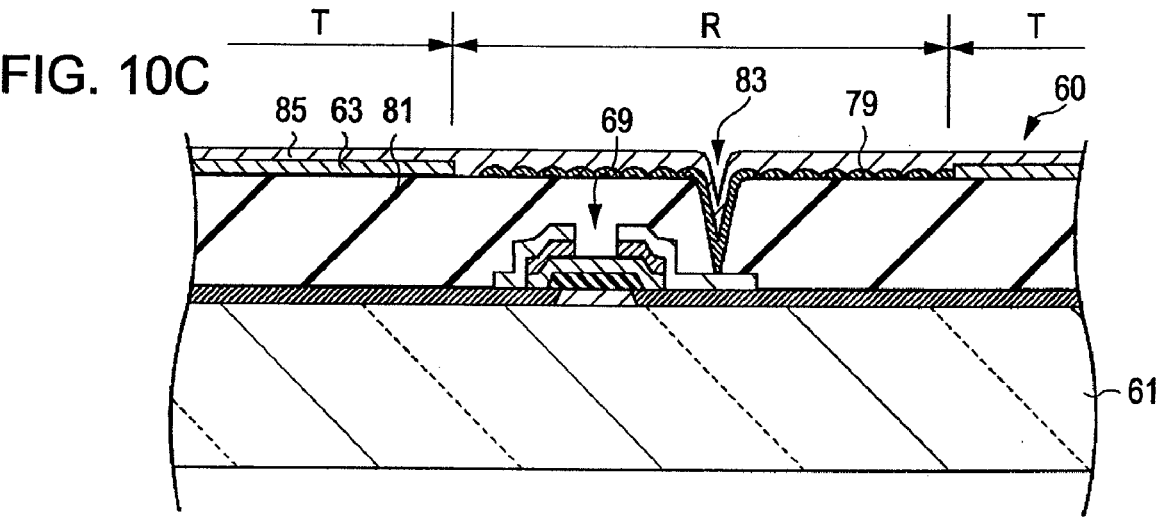

As shown in FIG. 10C, a transparent conductive layer made of ITO or the like is deposited on the organic insulating layer 81 by a sputtering process or another process and then patterned by a photolithographic process and then an etching process, whereby pixel electrodes 63 are formed in the display region in a matrix pattern. A second alignment layer 85 made of, for example, polyimide is formed over the pixel electrodes 63, whereby the element substrate 60 is obtained.

Figure 11A:
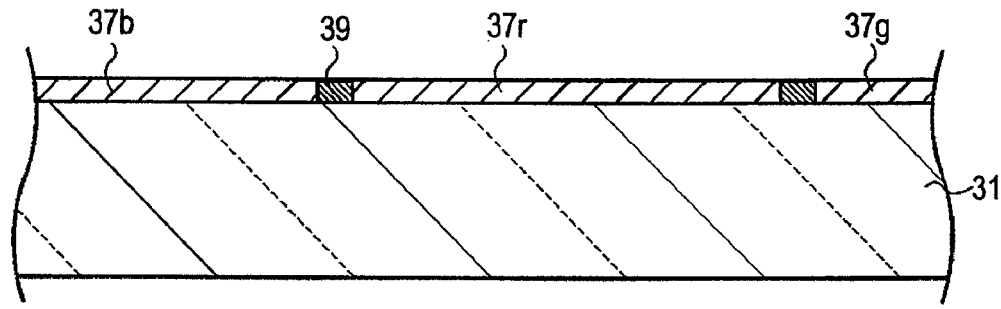
FIGS. 11A to 11C are sectional views illustrating a step of preparing a counter substrate included in the liquid crystal device manufactured by the method.
Figure 11B:
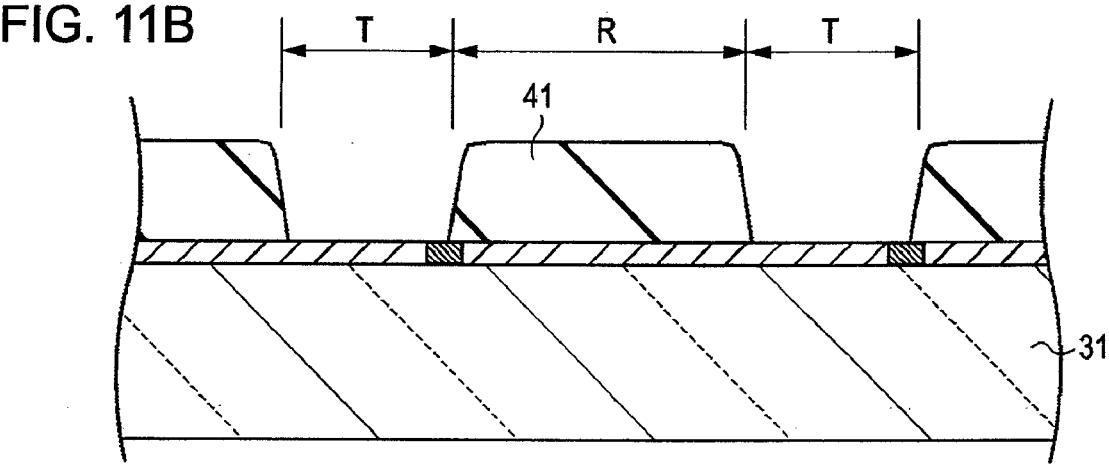
Figure 11C:
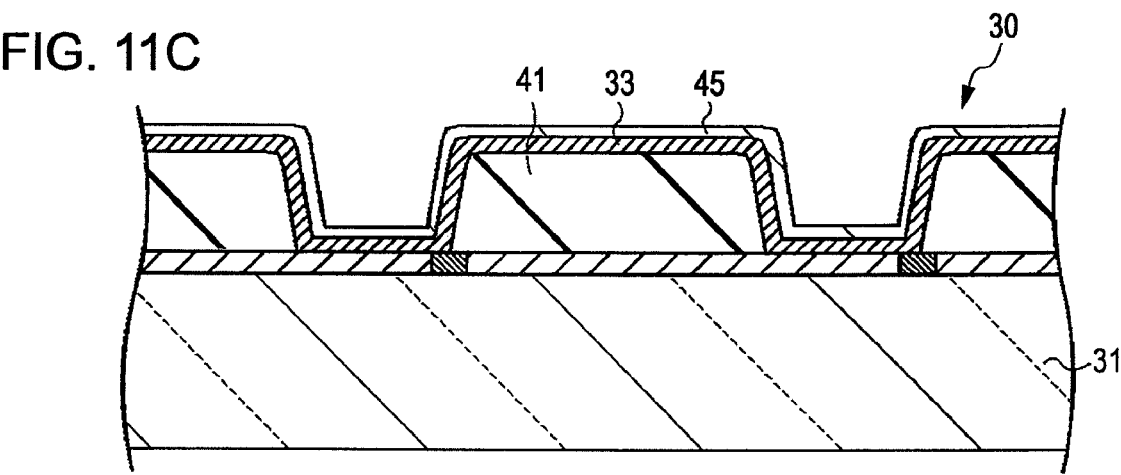

As shown in FIGS. 11A and 11B, the following layers are formed on a first base sheet 31, made of glass or the like, for forming the counter substrate 30: first colored layers 37r, second colored layers 37g, third colored layers 37b, and a light-shielding layer 39. As shown in FIG. 11C, a transparent conductive layer made of ITO or the like is deposited on these layers by a sputtering process or another process and then patterned by a photolithographic process and then an etching process, whereby a counter electrode 33 is formed over the display region. A first alignment layer 45 made of polyimide or the like is deposited on the counter electrode 33, whereby the counter substrate 30 is obtained.

In Step S3 shown in FIG. 9, the counter substrate 30 is bonded to the element substrate 60 with a sealing member such that a cell is formed. A liquid crystal material is injected into the cell.

In Step S4 shown in FIG. 9, polarizing films and other members are attached to outer faces of the counter and element substrates 30 and 60, semiconductor elements are mounted on the element substrate 60, and a flexible printed circuit board 93 is then attached to the element substrate 60, whereby the liquid crystal panel 10 is obtained.

Figure 12A:
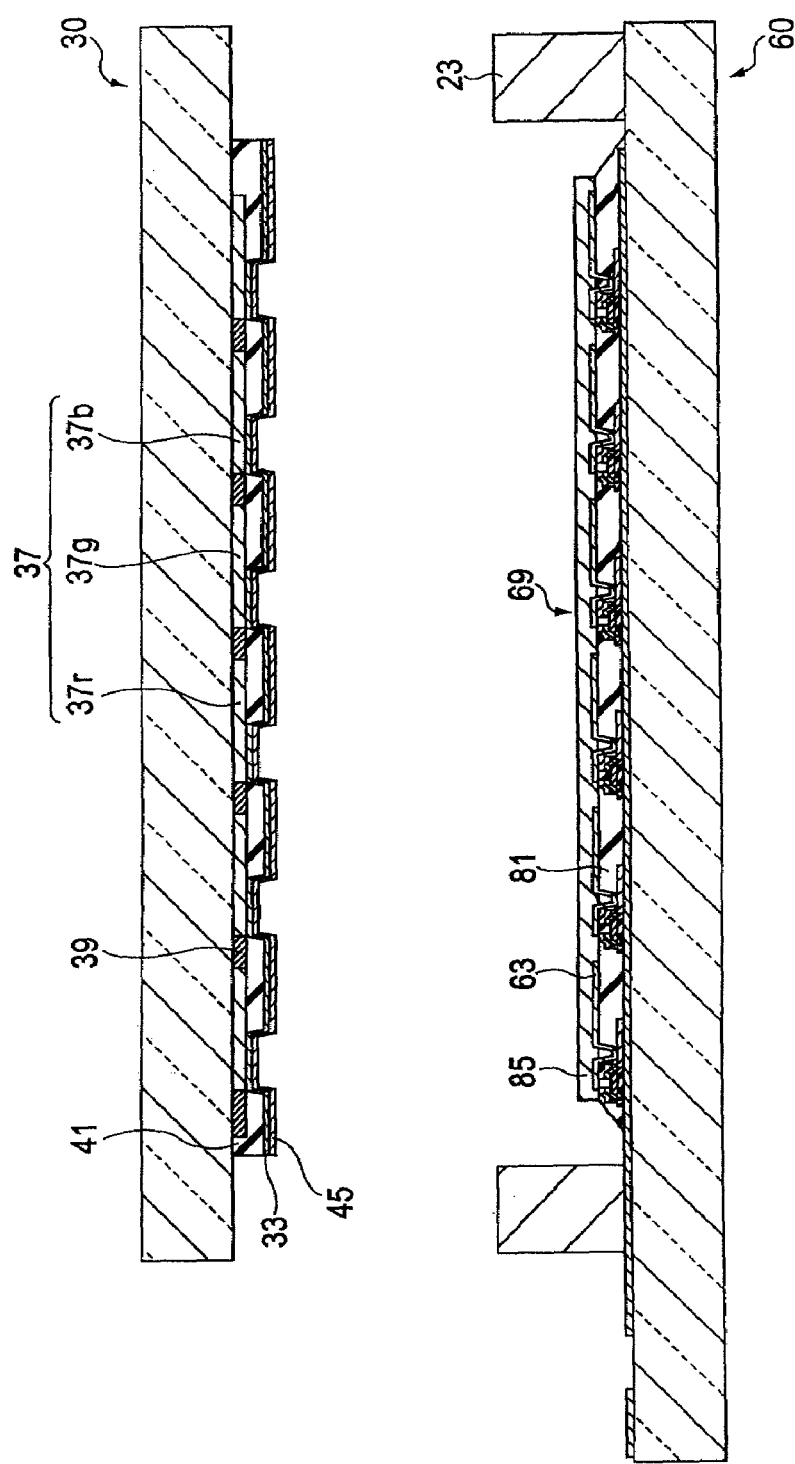
FIGS. 12A to 12C are sectional views illustrating a step of preparing a liquid crystal panel included in the liquid crystal device manufactured by the method.
Figure 12B:
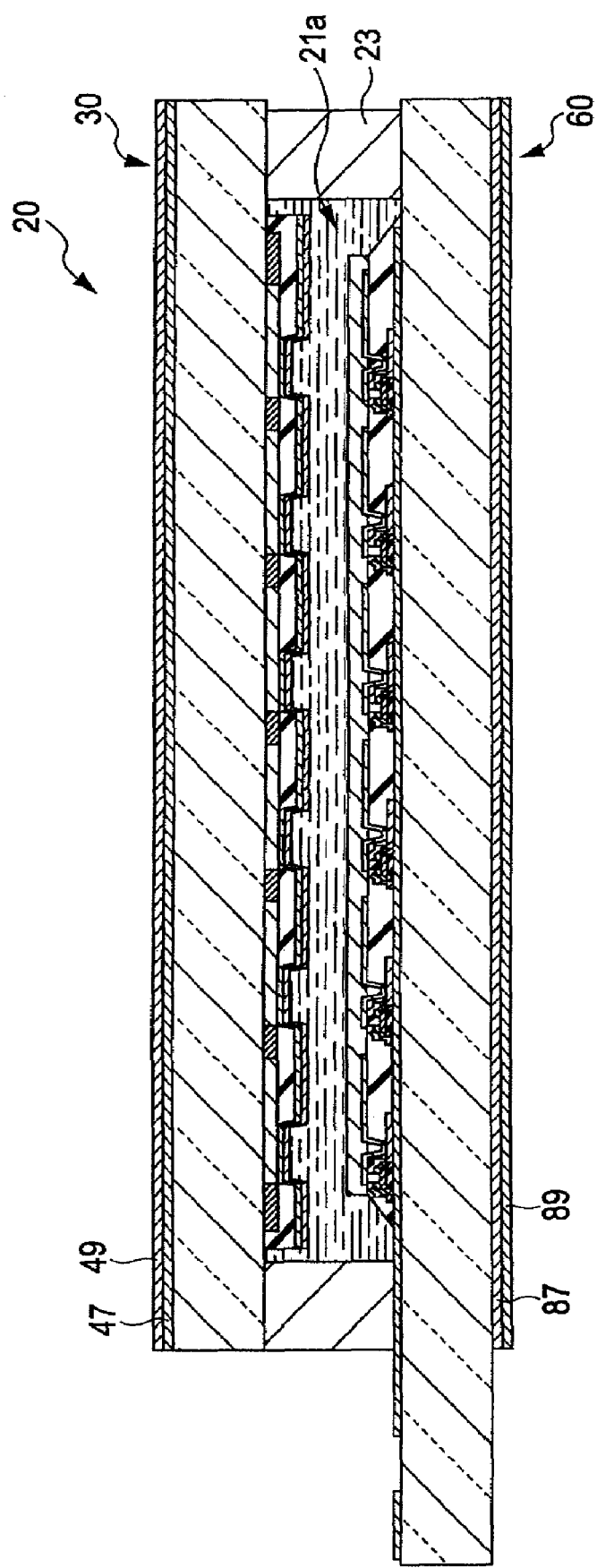
Figure 12C:
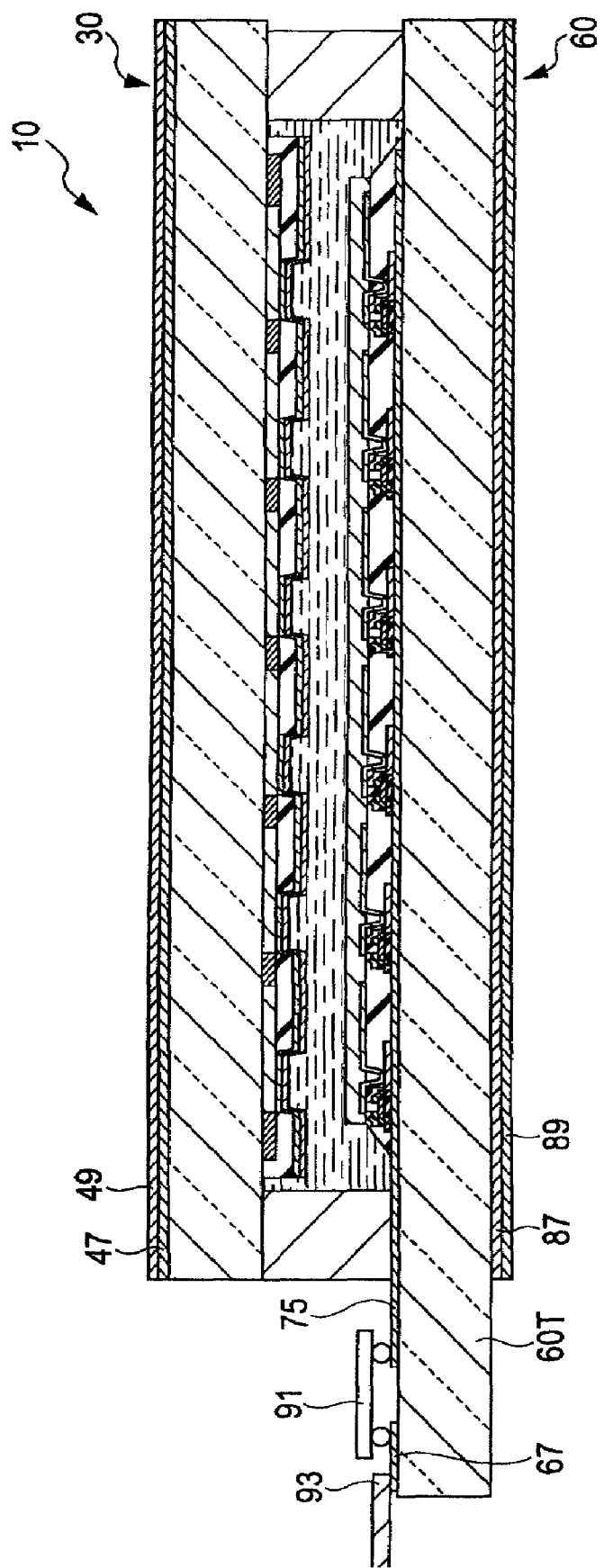

In particular, the liquid crystal panel 10 is prepared through sub-steps shown in FIGS. 12A to 12C.

The liquid crystal panel 10 is fixed to the housing 102 with the light-shielding double-faced tape 100 placed outside the display region.

In particular, in Step S5 shown in FIG. 9, the light sources 13 are mounted on a light source-driving circuit board 17, a light guide plate 15 is prepared, the light source-driving circuit board 17 and the light guide plate 15 are then provided in the housing 102 such that the light sources 13 are arranged near one side of the light guide plate 15. A light-reflective film 16 is provided at a predetermined position in this step.

In Step S6 shown in FIG. 9, the adhesion-preventing member 14 is provided at a position corresponding to the light sources 13 as shown in FIG. 1A or adhesion-preventing treatment is performed. The adhesion-preventing member 14 and adhesion-preventing treatment may be the same as those described in the first embodiment.

In Step S7 shown in FIG. 9, the light-shielding double-faced tape 100 is provided at a predetermined position. That is, the light-shielding double-faced tape 100 is provided around the housing 102 so as not cover the display region. The light-shielding double-faced tape 100 is used to bond an end portion of the liquid crystal panel 10 to an edge portion 102a of the housing 102 in a subsequent step.

In Step S8 shown in FIG. 9, the liquid crystal panel 10 is provided at a predetermined position. That is, the liquid crystal panel 10 is fixed to the housing 102 in such a manner that the end portion of the liquid crystal panel 10 to the edge portion 102a of the housing 102 with the light-shielding double-faced tape 100.

In Step S9 shown in FIG. 9, the flexible printed circuit board 93 is bent and then provided in the housing 102. Since the adhesion-preventing member 14 is provided between the light-shielding double-faced tape 100 and the light sources 13 or adhesion-preventing treatment is performed, the liquid crystal panel 10 can be prevented from being lifted.

In Step S10 shown in FIG. 9, the liquid crystal panel 10 is pressed downward and the alignment thereof is then performed, whereby the fixing of the liquid crystal panel 10 is finished.

Third Embodiment

A third embodiment of the present invention provides an electronic apparatus including substantially the same liquid crystal device as that of the first embodiment.

Figure 13:
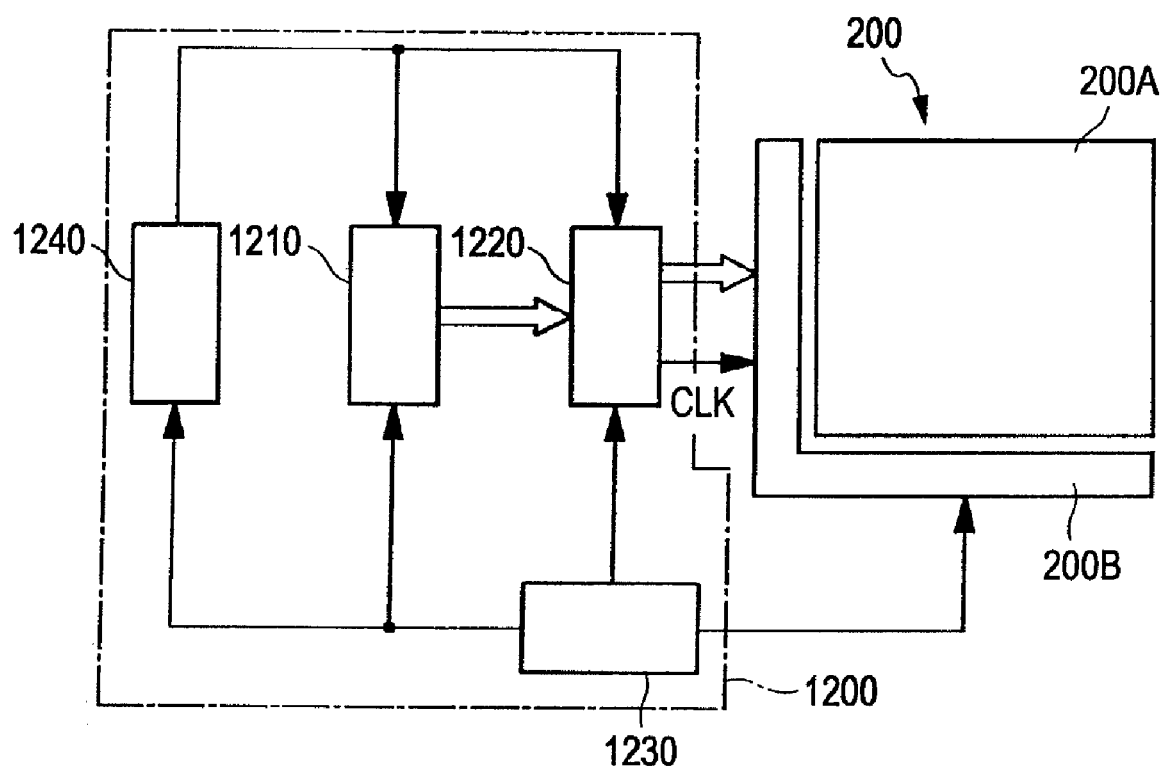
FIG. 13 is a block diagram of an electronic apparatus according to a third embodiment of the present invention.

FIG. 13 shows the configuration of the electronic apparatus. The electronic apparatus includes a liquid crystal panel 200 and a control unit 1200 for controlling the liquid crystal panel 200. With reference to FIG. 13, the liquid crystal panel 200 includes a panel structure 200A and a driving circuit 200B including semiconductor elements (IC chips). The control unit 1200 preferably includes a display information output source 1210, a display information-processing circuit 1220, a power supply circuit 1230, and a timing generator 1240.

The display information output source 1210 preferably includes a memory unit including a read-only memory (ROM) or a random access memory (RAM), a storage unit including a magnetic recording disk or an optical recording disk, and a synchronous circuit for synchronously outputting digital image signals. The display information output source 1210 supplies display information to the display information-processing circuit 1220 on the basis of clock signals CLK generated by the timing generator 1240. The display information is transmitted in the form of image signals having a predetermined format.

The display information-processing circuit 1220 preferably includes various sub-circuits such as a serial-parallel conversion sub-circuit, an amplification/inversion sub-circuit, a rotation sub-circuit, a gamma correction sub-circuit, and a clamp sub-circuit. The display information-processing circuit 1220 processes the display information into the image signals and then supplies the image signals to the driving circuit 200B together with the clock signals CLK. The driving circuit 200B preferably includes a scanning line-driving sub-circuit, a data line-driving sub-circuit, and an inspection sub-circuit. The power supply circuit 1230 applies predetermined voltages to the above components.

In the electronic apparatus, an adhesion-preventing member 14 is disposed between a light-shielding double-faced tape and light sources or adhesion-preventing treatment is performed; hence, the light sources are prevented from being misaligned with a light guide plate. This prevents the electronic apparatus from displaying an image with low or non-uniform brightness.

The present invention provides a liquid crystal device and a method for manufacturing the liquid crystal device. In the liquid crystal device, a liquid crystal panel is fixed to a housing with a light-shielding double-faced tape and an adhesion-preventing member is provided between the light-shielding double-faced tape and light sources or adhesion-preventing treatment is performed. Hence, the light sources are prevented from being misaligned with a light guide plate.

The present invention further provides an electronic apparatus including the liquid crystal device, which is a type of electro-optical device, including TFTs. Examples of the electronic apparatus include mobile phones; personal computers; liquid crystal televisions; viewfinder-type or direct view-type video tape recorders; car navigation systems; pagers; electrophoretic apparatuses; electronic notebooks; portable electronic calculators; word processors; work stations; video phones; point-of-sale (POS) terminals; electronic apparatuses having touch panels; and apparatuses, such as field emission displays (FEDs) and surface-conduction electron-emitter displays (SEDs), having electron-emitting devices.

What is claimed is:

1. A liquid crystal device, comprising:
   a liquid crystal panel;
   light sources;
   a light guide plate having a side face opposed to the light sources, for guiding light emitted from the light sources to the liquid crystal panel;
   a flexible printed circuit board electrically connected to the liquid crystal panel; and
   a housing accommodating the liquid crystal panel and the light guide plate, wherein the flexible printed circuit board is fixed to a portion of the housing in such a state that the flexible printed circuit board is curved, the liquid crystal panel is fixed to the housing with a light-shielding double-raced tape placed outside a display region including a sub-region containing the light sources, and the light sources are spaced from the light-shielding double-faced tape with an adhesion-preventing member disposed therebetween or adhesion-preventing treatment is performed; and
   wherein the light sources are located between the portion of the housing and the side face of the light guide plate.

2. The liquid crystal device according to claim 1, wherein the light sources are mounted on a light source-driving circuit board different from the flexible printed circuit board and the light-shielding double-faced tape is prevented from adhering to the light source-driving circuit board with the adhesion-preventing member or by the adhesion-preventing treatment.

3. The liquid crystal device according to claim 1, wherein the adhesion-preventing member includes an electrically insulating film.

4. The liquid crystal device according to claim 1, wherein the adhesion-preventing member includes portions of release members attached to the light-shielding double-faced tape.

5. The liquid crystal device according to claim 1, wherein the adhesion-preventing member has raised portions and recessed portions.

6. The liquid crystal device according to claim 1, wherein the adhesion-preventing member has positioning portions.

7. The liquid crystal device according to claim 1, wherein the adhesion-preventing treatment is silicone treatment or fluorine treatment.

8. The liquid crystal device according to claim 1, wherein the adhesion-preventing treatment is to remove an adhesive from the light-shielding double-faced tape.

9. An electronic apparatus, comprising:
   the liquid crystal device according to claim 1.

10. A method for manufacturing a liquid crystal device including a liquid crystal panel; light sources; a light guide plate having a side face opposed to the light sources, for guiding light emitted from the light sources to the liquid crystal panel; a flexible printed circuit board electrically connected to the liquid crystal panel; and a housing accommodating the liquid crystal panel and the light guide plate, the method comprising:
   fixing the liquid crystal panel to the housing with a light-shielding double-faced tape placed outside a display region including a sub-region containing the light sources;
   providing an adhesion-preventing member or performing adhesion-preventing treatment between the light-shielding double-faced tape and the light sources; and
   bending the flexible printed circuit board to fix the flexible printed circuit board to a portion of the housing, wherein the light sources are located between the portion of the housing and the side face of the light guide plate.

* * * * *